United States Patent
Ulenas

(10) Patent No.: US 7,797,474 B2
(45) Date of Patent: *Sep. 14, 2010

(54) METHOD AND APPARATUS FOR ENHANCING UNIVERSAL SERIAL BUS APPLICATIONS

(75) Inventor: Jonas Ulenas, Port Washington, NY (US)

(73) Assignee: Vetra Systems Corporation, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/821,986

(22) Filed: Jun. 26, 2007

(65) Prior Publication Data

US 2007/0255883 A1    Nov. 1, 2007

Related U.S. Application Data

(63) Continuation of application No. 11/360,304, filed on Feb. 22, 2006, now Pat. No. 7,246,189.

(60) Provisional application No. 60/738,115, filed on Nov. 18, 2005.

(51) Int. Cl.
  *G06F 13/14*   (2006.01)
  *G06F 13/12*   (2006.01)
  *G09G 5/00*    (2006.01)
  *G06F 15/173*  (2006.01)

(52) U.S. Cl. .................. 710/305; 710/62; 710/300; 710/312; 710/313; 710/316; 709/238; 345/156

(58) Field of Classification Search ......................... None
See application file for complete search history.

(56) References Cited

U.S. PATENT DOCUMENTS

| | | | |
|---|---|---|---|
| 6,308,239 B1 | 10/2001 | Osakada et al. | |
| 6,324,605 B1 | 11/2001 | Rafferty et al. | |
| 6,363,085 B1 | 3/2002 | Samuels | |
| 6,381,666 B1 | 4/2002 | Kejser et al. | |
| 6,571,305 B1 | 5/2003 | Engler | |
| 6,708,247 B1 | 3/2004 | Barret et al. | |
| 6,922,748 B2 | 7/2005 | Engler | |
| 6,934,793 B2 | 8/2005 | Ying et al. | |
| 6,954,808 B2 | 10/2005 | Russell | |
| 6,961,798 B2 | 11/2005 | Ferguson | |
| 7,003,613 B1 | 2/2006 | Wang et al. | |
| 7,120,724 B2 | 10/2006 | Ferguson | |
| 7,149,833 B2 * | 12/2006 | McLeod | 710/300 |
| 7,461,318 B2 * | 12/2008 | Fukae et al. | 714/749 |
| 2002/0097220 A1 | 7/2002 | Ferguson et al. | |
| 2003/0093588 A1 | 5/2003 | Garney et al. | |
| 2003/0131127 A1 | 7/2003 | King et al. | |
| 2005/0216620 A1 | 9/2005 | Sandulescu et al. | |
| 2006/0059293 A1 | 3/2006 | Wurzburg et al. | |

OTHER PUBLICATIONS

Universal serial Bus Specification—Revision 2.0—Apr. 27, 2000—pp. 1, 19, and 199-204.

* cited by examiner

*Primary Examiner*—Mark Rinehart
*Assistant Examiner*—Brian T Misiura
(74) *Attorney, Agent, or Firm*—Fulbright & Jaworski LLP

(57) ABSTRACT

A system for enhancing universal serial bus (USB) applications comprises an upstream processor, a downstream processor and a main controller. The upstream processor accepts standard USB signals from a USB host and independently provides responses required by USB specification within the required time frame. The downstream processor connectable to USB-compliant devices accepts the USB signals from the USB-compliant devices and provides responses required by USB specification within the required time frame. The main controller interconnects the upstream and downstream processors, and provides timing independence between upstream and downstream timing.

20 Claims, 15 Drawing Sheets

GROUP DEFINITION (301)
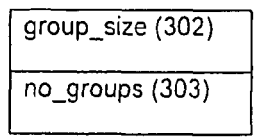
(a)
GROUP LIST I (304)
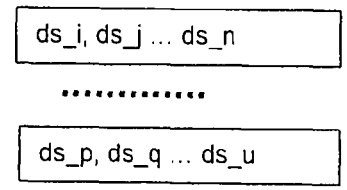
(b)
next_address (306)
Peripheral_Definition_List (307)
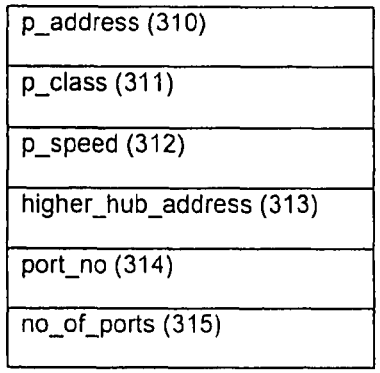
(d)
DEVICE CONTROL (305)
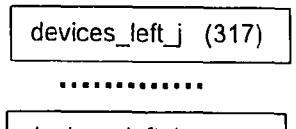
(c)
*Fig. 7*

Peripheral_Definition_List (307)

| p_address = 1 |
| higher_hub_address = 0 |
| port_no = 0 |
| no_of_ports = 2 |
| p_class = 9 |
| p_speed = full | next_address = 5 (306)

GROUP DEFINITION (301)

| group_size = 2 |
| no_groups = 1 |

(a)

GROUP LIST (304)

| ds_1, ds_2 |

(b)

DEVICE CONTROL (305)

| devices_left = 0 |  (317)

(c)

| p_address = 2 |
| p_class <> 9 |
| p_speed = full |
| higher_hub_address = 1 |
| port_no = 1 |
| no_of_ports = 0 |
| p_address = 3 |
| p_class = 9 |
| p_speed = full |
| higher_hub_address = 1 |
| port_no = 2 |
| no_of_ports = 4 |
| p_address = 4 |
| p_class =<> 9 |
| p_speed = low |
| higher_hub_address = 3 |
| port_no = 4 |
| no_of_ports = 0 |

(d)

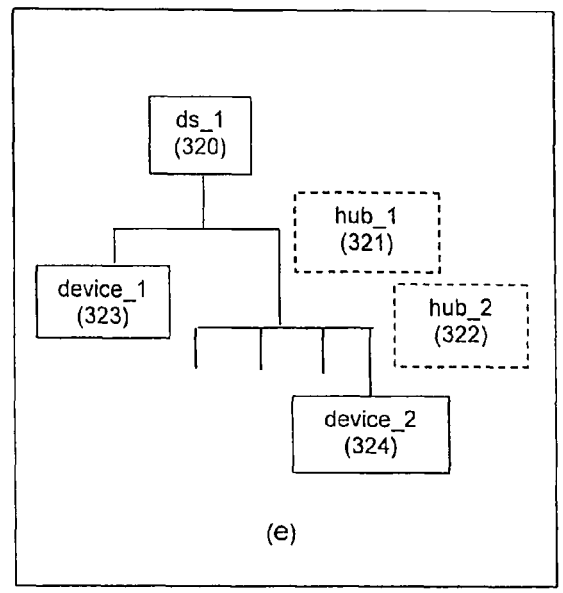

METHOD AND APPARATUS FOR ENHANCING UNIVERSAL SERIAL BUS APPLICATIONS

CROSS REFERENCE TO RELATED APPLICATIONS

The present application is a continuation application of application Ser. No. 11/360,304, filed Feb. 22, 2006 now U.S. Pat. No. 7,246,189, which claims benefit of U.S. Provisional Application No. 60/738,115 filed Nov. 18, 2005, which is incorporated by reference in their entirety.

BACKGROUND OF THE INVENTION

The Universal Serial Bus (USB) is a connection standard which allows a variety of peripheral devices to be easily attached to computers supporting the standard. It has become widely adopted.

The USB standard was created by an alliance of some of the largest companies in the computer and communication industry. The latest specification defining USB is Revision 2.0 of April 2000, and is here referred to as the "USB Specification", which term can include future modifications and revisions. The USB standard is non-proprietary and is maintained by an open industry organization known as the USB Forum. The USB Specification establishes a number of criteria, which must be met in order to be compliant to USB standards. The USB Specification and information about the standard are available at www.usb.org.

The USB standard has the great advantage from the user's point of view in that it permits peripherals to be readily connected to computing devices often with no manual configuration to be made by an end user.

The USB is a strict master-slave bus. There is one USB master, usually called "host". The host acts as master of the bus, controlling all communications. Typically, the USB host is a computing device, such as a personal computer. Devices, or peripherals, communicate with the host only if so commanded by the host. USB peripherals are defined by the USB specification as being of two types: "hubs" and "functions". "Functions" are referred to here as "USB-compliant devices" or "devices". The USB is based on a tiered star topology with one hub at the center of each star. Each "ray" from each "star" terminates in exactly one hub or device. Hubs convert a single upstream attachment point into multiple downstream attachment ports. Either a device or another hub can be attached to such a downstream port. In this manner, the USB specification limit of 127 unique USB-compliant devices attached at any given time can be attained. Devices include computer peripherals such as keyboards, mice, joy sticks, cameras, printers, external storage devices, multi-media devices and the like. Since all device communications eventually converge at the host, and there can be up to 127 devices on the same bus, time allocation on the bus is extremely critical. The USB specification addresses this issue, and other issues, with a detailed definition of electrical signaling, data format and communication protocol. Briefly, the protocol divides time on the bus into one millisecond frames, which may be further subdivided into eight 125 microsecond microframes for the high speed version of the bus, defines a number of transfer types, and tightly controls timing, including the time of response from hubs or USB-compliant devices to host commands. The tight timing control is necessary to provide for maximum bus bandwidth while maintaining communication integrity and error checking.

The USB specification has made great advances in facilitating the connection of up to 127 of a wide variety of devices to any USB-enabled computer, using only one connector type. In providing this capability and convenience, a number of tradeoffs had to be made, which result in limiting the application of the USB in many situations. The following three USB specification requirements limit its application in many situations. First, the tight timing specification has the consequence that in practice devices have to be no further away from the host than 30 meters. Even this can only be achieved by connecting five hubs in series, since the cabling limit is 5 meters between a device and a hub. Both the relatively short absolute length of 30 meters and the inconvenience and cost of having to use five extra hubs are a limitation in many computer applications. Second, the USB specification allows any number of devices of the same type, such as several keyboards or several mice, to be connected simultaneously. This is a desirable feature in itself, since there are many applications where access to one computer is needed from several workstations. The disadvantage arises that all such devices have simultaneous access to the computer, allowing more than one user to enter or alter data, for example, possibly resulting in errors and undesirable results. Third, the tight timing specification and protocol definition limit the ability to switch one device from one host, or computer, to another. If the communications protocol is not adhered to or the timing specification violated during switching, the host will detect an error, and after several recovery attempts, will declare the device "inoperable" and refuse to communicate with it. One way to switch one device from one host to another is to either physically unplug it or to simulate unplug by appropriate signaling. Then to connect it to another host, or computer, by physically plugging it in or by simulating plug in by appropriate signaling. Both unplugging a device and plugging it in, result in a processing delay in the host. It takes the host time to detect device unplug, and additional time to detect and process device plug in. On plug in, the host goes through an extensive process, called "enumeration", to determine the type and capabilities of a device and to "connect" it to the USB. These delays are undesirable in many computer system applications.

Solutions that enhance USB in these areas would be very desirable in many computer system applications. Especially desirable would be one solution that overcomes all three limitations above. The present invention offers a solution to all three limitations identified hereinabove.

The prior art has addressed mainly the limitation in connection distance between a peripheral and the host. U.S. Pat. No. 6,363,085 to Samuels describes the use of an active repeater. This system's ability to improve the distance is limited, since it only decreases the propagation delay in the cable, which does not result in a significant increase in distance. U.S. Pat. Nos. 6,571,305 and 6,922,748, both to Engler, describe a system consisting of two intelligent emulators. One, at the host end, emulates a device, the second one, at the device end, emulates a host. The device emulator satisfies all timing requirements to the host, and the host emulator does the same at the device end. However, the information flow is limited to data from the peripheral device to the host. There is no provision for the host to determine the nature and detailed capabilities of the connected device, since the communications channel in the direction from the host to device carries only error reports. That is, the host is not able to perform enumeration on the real device, only on the device emulator. Many peripheral devices, while conforming to USB definitions and specifications for a device type, also have unique features and capabilities. Such capabilities are communicated to the host in response to host requests during enumeration, which will not be made known to the host in this system. The system is thereby limited to handle only devices that are specifically emulated in the device emulator. The lack of a communications channel from host to device also prevents the host from commanding the device, which is needed in many devices. For instance, conventional keyboards have indicators that light to indicate Caps Lock, Num Lock and Scroll Lock. Engler has no provisions for such capabilities. Engler also does not have capability to signal the host when a device, as opposed to the device emulator, has been plugged in or unplugged. U.S. Pat. No. 6,381,666 to Kejser et al., describe an "extended range hub", consisting of a Local Expander and a Remote Expander. In similarity to Engler, two units are provided. One, the Local Expander, is located at the host. The second, the Remote Expander, is located at the device. This system improves on Engler by providing for host request pass-on to the real device. However, Kejser does not provide for error handling, and does not provide for timing management to prevent running into the babble condition at the Remote Expander either on sending data to the remote device or requesting data from it. Kejser also does not treat the "high-speed" protocol features, introduced by revision 2.0, the current revision of the USB specification, such as split transactions, the NYET handshake, nor "chirp" or "squelch" signaling. Similar to Kejser, U.S. Pat. No. 6,954,808 to Russell describes an USB extension system consisting of two hubs, a transmitter hub and a receiver hub, interconnected by a non-USB compliant link. Russell has no provisions to insure that the hub located at the host, the transmitter hub, is able to respond to host communications within the time required by the USB specification, instead response timing is dependent on timing from the device and the speed of the communications channel between the two hubs. U.S. Pat. No. 6,708,247 to Barret et al. describes a system consisting of a host controller and a remote hub, interconnected by an non-USB compliant bus. Barret requires that the host controller be modified in accordance with the invention. U.S. Pat. No. 6,961,798 to Ferguson provides for extension of certain USB devices via non-USB communications media. However, the invention requires that the host be modified with transmitter circuits of the invention. U.S. Pat. No. 6,934,793 to Ying et al. treats sharing one USB device among up to four PC hosts. However, there is no provision in Ying's multiplexer to assure that the timing requirements of the USB specification are met nor provisions to avoid collision of communications from the plurality of PC's. None of the above prior art covers the situation where an USB-compliant device or multiple devices connect selectively to a number of USB hosts while meeting the timing requirements of the USB specification, nor do they cover the situation where multiple USB-compliant devices connect to the same host and are enabled selectively while meeting the timing requirements of the USB specification, nor the use of standard, unmodified USB hosts, hubs, and USB-compliant devices.

It would be advantageous to have a method and system that does not have such limitations and omissions, and that handles the additional protocol cases and conditions introduced by revision 2.0 of the USB specification, including handling USB high-speed communications, and requires no modifications to USB hosts, hubs or to USB-compliant devices.

The present invention overcomes these limitations and provides enhancements in connection separation length between USB-compliant device and USB host, in switching one or more devices among many hosts and in connecting many devices to the same host with control over their communications such that they do not interfere with one another. The present invention requires no changes or modifications to USB hosts, hubs or to USB-compliant devices; standard hosts, hubs and devices can be used with the current invention.

OBJECTS AND SUMMARY OF THE INVENTION

An object of the present invention is to provide a system and technique for switching one USB-compliant device among multiple USB hosts without disconnecting the device from each host, and while meeting all USB specification requirements, including timing, at the host and the device and providing capabilities for the hosts to determine the nature, type and capabilities of the device.

An object of the present invention is to provide a system and technique for switching a group of USB-compliant devices as a unit among multiple USB hosts without disconnecting the devices from each host, and while meeting all USB specification requirements, including timing, at the hosts and the devices and providing capabilities for the hosts to determine the nature, type and capabilities of the devices.

An object of the present invention is to provide a system and technique for switching multiple USB-compliant devices among multiple USB hosts without disconnecting the devices from each host, and allowing simultaneous connection of several devices to several hosts, each device connected to a different host, and while meeting all USB specification requirements, including timing, at the hosts and the devices and providing capabilities for the hosts to determine the nature, type and capabilities of the devices.

An object of the present invention is to provide a system and technique for switching multiple groups of USB-compliant devices as a unit among multiple USB hosts without disconnecting the devices from each host, and allowing simultaneous connection of several groups of devices as a unit to several USB hosts, each group connected to a different host, and while meeting all USB specification requirements, including timing, at the hosts and the devices and providing capabilities for the hosts to determine the nature, type and capabilities of the devices.

An object of the present invention is to provide a system and technique for several USB-compliant devices of the same type but not necessarily identical in model to be connected selectively to one USB host without interfering with one another and while meeting all USB specification requirements, including timing, at the host and the devices and providing capabilities for the host to determine the nature, type and capabilities of the devices.

An object of the present invention is to provide a system and technique for groups of several USB-compliant devices of the same type but not necessarily identical in model to be connected to one USB host as a group without one group interfering with another and while meeting all USB specification requirements, including timing, at the host and the devices and providing capabilities for the host to determine the nature, type and capabilities of the devices.

An object of the present invention is to provide a system and technique for connecting USB-compliant devices to an USB host while positioned beyond the distance limits resulting from the USB specification requirements, while complying with all USB specification requirements including signal timing at the host and the device and providing capabilities for the host to determine the nature, type and capabilities of the device, while achieving the previously stated objectives.

An object of the present invention is to provide a system and technique for switching a group of USB-compliant devices as a unit among many USB hosts without disconnecting the devices from each host while positioned beyond the distance limits resulting from USB specification requirements, and while meeting all USB specification requirements, including timing, at the hosts and the devices and providing capabilities for the hosts to determine the nature, type and capabilities of the devices.

An object of the present invention is to provide a system and technique for groups of several USB-compliant devices of the same type but not necessarily identical in model to be connected selectively to one USB host as a group without one group interfering with another while positioned beyond the distance limits resulting from USB specification requirements and while meeting all USB specification requirements, including timing, at the host and the devices and providing capabilities for the host to determine the nature, type and capabilities of the devices.

An object of the present invention is to provide a system and technique for switching multiple groups of USB-compliant devices as a unit among multiple USB hosts while positioned beyond the distance limits resulting from the USB specification requirements without disconnecting the devices from each host, and allowing simultaneous connection of several groups of devices as a unit to several hosts, each group connected to a different host, and while meeting all USB specification requirements at the hosts and the devices and providing capabilities for the hosts to determine the nature, type and capabilities of the devices.

An object of the present invention that no modifications need to be made to the USB host, the host USB controllers, root and other hubs or to USB-compliant devices to provide such enhancements.

An object of the present invention to cover the full range of device speeds specified in the USB specification, low, full and high speed, and other speeds which may be specified in future revisions of the USB specification, while achieving the previously stated objectives.

An object of the present invention to maintain data toggle synchronization among the USB-compliant device(s) and USB host(s), while achieving the previously stated objectives.

An object of the present invention to provide for transmission of resume signaling from USB-compliant device(s) to the host(s) for devices with the remote wake-up feature, while achieving the previously stated objectives.

An object of the present invention to provide for transmission of device attach (plug-in) or detach (plug-out) events signaling from device(s) to the host(s), while achieving the previously stated objectives.

In accordance with an embodiment of the present invention, the system comprises one or more processing elements handling connections to one or more USB hosts and one or more processing elements handling connections to one or more USB-compliant devices, hereinafter called "devices", the processing elements connected by a main controller processing element, which includes routing and attachment topology management functions. Only the signals in the connections to the USB host(s) and to the USB device(s) conform to the USB specification standards. All other signals are optimized to fit their particular role.

In accordance with an embodiment of the present invention, the apparatus comprises one or more properly programmed microprocessors, or other digital processing engines, controlling one or more USB serial interface engines (SIE), connected to one or more USB hosts on the upstream side and to one or more devices on the downstream side. An upstream (US) SIE connects to a USB host and decodes messages and data on the USB, accepts those addressed to it, and sends messages and data in the appropriate USB format. A downstream (DS) SIE connects to USB peripherals, which may be devices or hubs, and decodes messages and data on the USB and sends messages and data in the appropriate USB format addressed to a particular peripheral. The microprocessor is programmed to control one or more US SIE's to accept commands and data, and to provide to the US USB any data received from downstream that is destined to the particular upstream connection. It is further programmed to provide to the DS SIE's data received from upstream and destined to the particular downstream connection. The microprocessor further contains buffers to hold messages from the USB for analysis to determine the required action, to serve as part of the communications medium between upstream and downstream, and to format and hold outgoing upstream and DS USB messages.

USB hubs are incorporated in one embodiment of the invention when more than one device is to be connected to a particular host computer. The hub is placed between the US SIE and the upstream connection to an USB host and groups several US SIE's into one physical connection to the host.

It would be appreciated by one of ordinary skill in the art that any apparatus that can interpret instructions for data handling in accordance with specified logic and algorithms can be used to perform the microprocessor functions.

An example of a microprocessor that also incorporates an USB Serial Interface Engine supporting all three USB speeds, low-, full- and high-speed, is the EZ-USB FX2LP™ available from Cypress Semiconductor Corporation. An example of a microprocessor that also incorporates an USB Serial Interface Engine supporting two USB speeds, low- and full-speed, is the AT89C5130A-M available from Atmel Corporation. Examples of USB high-speed hubs are the ISP1520 with four downstream ports and the ISP1521 with seven downstream ports, both available from Philips Semiconductors.

In accordance with an embodiment of the present invention, a system for enhancing universal serial bus (USB) applications comprises an upstream processor, a downstream processor and a main controller. The upstream processor accepts standard USB signals from a USB host and independently provides responses required by USB specification within the required time frame. The downstream processor connectable to USB-compliant devices accepts the USB signals from the USB-compliant devices and provides responses required by USB specification within the required time frame. The main controller interconnects the upstream and downstream processors, and provides timing independence between upstream and downstream timing.

In accordance with an embodiment of the present invention, a method for enhancing universal serial (USB) applications comprises the steps of accepting standard USB signals from a USB host by an upstream processor and independently providing responses in conformance with USB specification, accepting the USB signals from USB-compliant devices by a downstream processor and providing responses in conformance with USB specification, and interconnecting the upstream and downstream processors while providing timing independence between upstream and downstream timing.

In accordance with an embodiment of the present invention, a computer readable medium comprising code for enhancing universal serial (USB) applications. The code comprising instructions for accepting standard USB signals from a USB host by an upstream processor and independently providing responses in conformance with USB specification, accepting the USB signals from USB-compliant devices by a downstream processor and providing responses in conformance with USB specification, and interconnecting the upstream and downstream processors while providing timing independence between upstream and downstream timing.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example and not intended to limit the present invention solely thereto, will best be understood in conjunction with the accompanying drawings in which:

FIG. 7(a)-(d) are diagrams of the data structures of Attachment Topology Management in accordance with an embodiment of the present invention;

FIG. 8(a)-(e) are diagram of an example of the use of the data structures of Attachment Topology Management in accordance with an embodiment of the present invention;

DETAILED DESCRIPTION OF THE PREFERRED

The following detailed description sets forth numerous specific details to provide a thorough understanding of the invention. However, those skilled in the art will appreciate that the invention may be practiced without these specific details. In other instances, well known methods, procedures, components, and circuits have not been described in detail so as not to obscure the invention.

Figure 1:
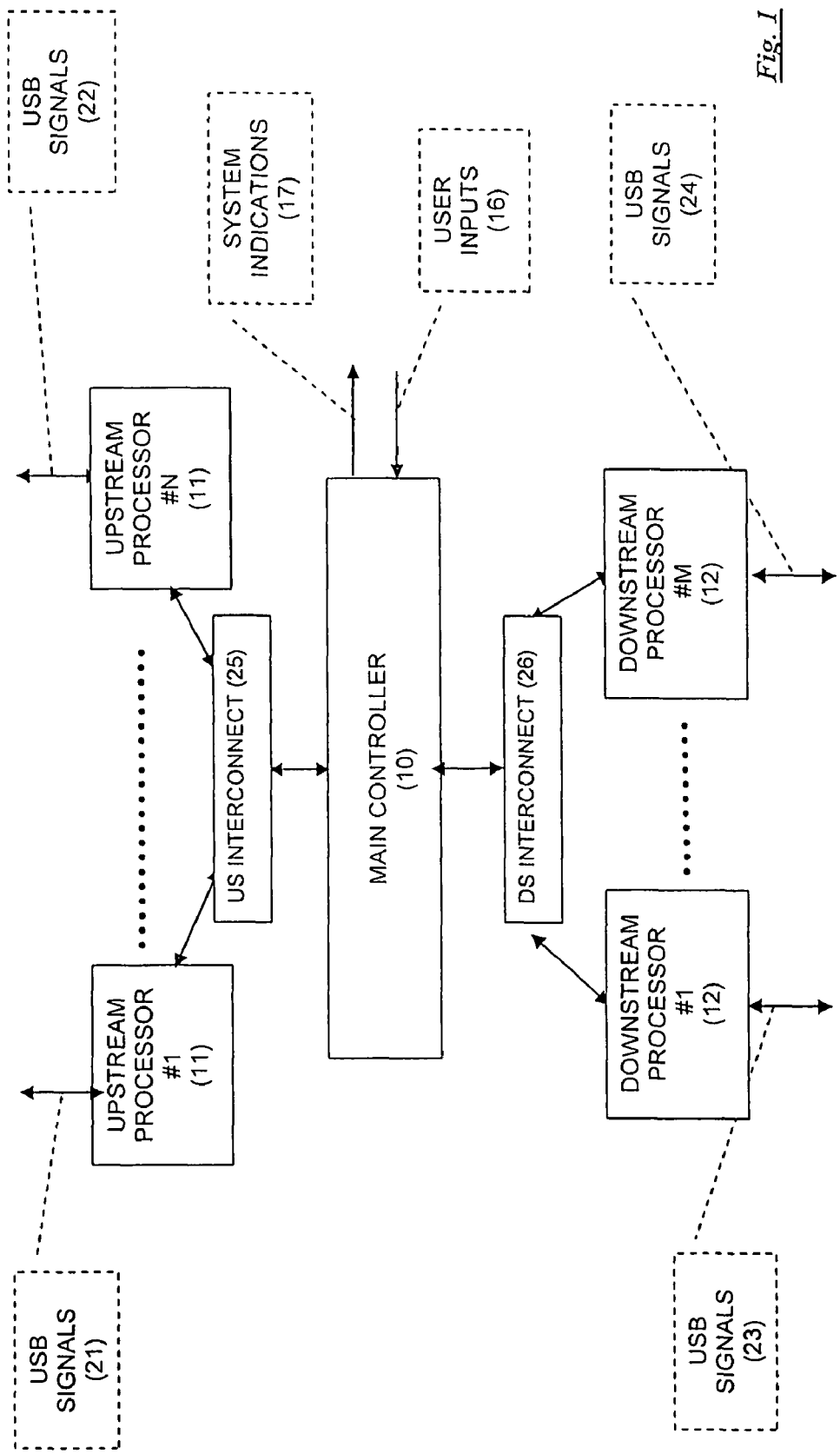
FIG. 1 is a block diagram of a system in accordance with an embodiment of the present invention.

Turning now to FIG. 1, there is illustrated a system in accordance with an embodiment of the present invention. A number of Upstream (US) Processors (11) connect to USB hosts via USB signals (21) and (22). USB signals to each USB host are individual for that host. The US Processors (11) also connect to the Main Controller (10) via US Interconnect (25).

A number of Downstream (DS) Processors (12) provide connection to a number of USB-compatible devices via USB signals (23) and (24). USB signals to each USB-compatible device are individual for that device. The DS Processors (12) also connect to the Main Controller (10) via DS Interconnect (26). The Main Controller (10) analyzes, processes and bidirectionally routes information between the US Processors (11) and the DS Processors (12). The Main Controller (10) also provides time decoupling between the US and DS sides. It will be understood by one skilled in the art that the number of US Processors (11) and the number of DS Processors (12) can be more or less than the number shown in FIG. 1.

Figure 1A:
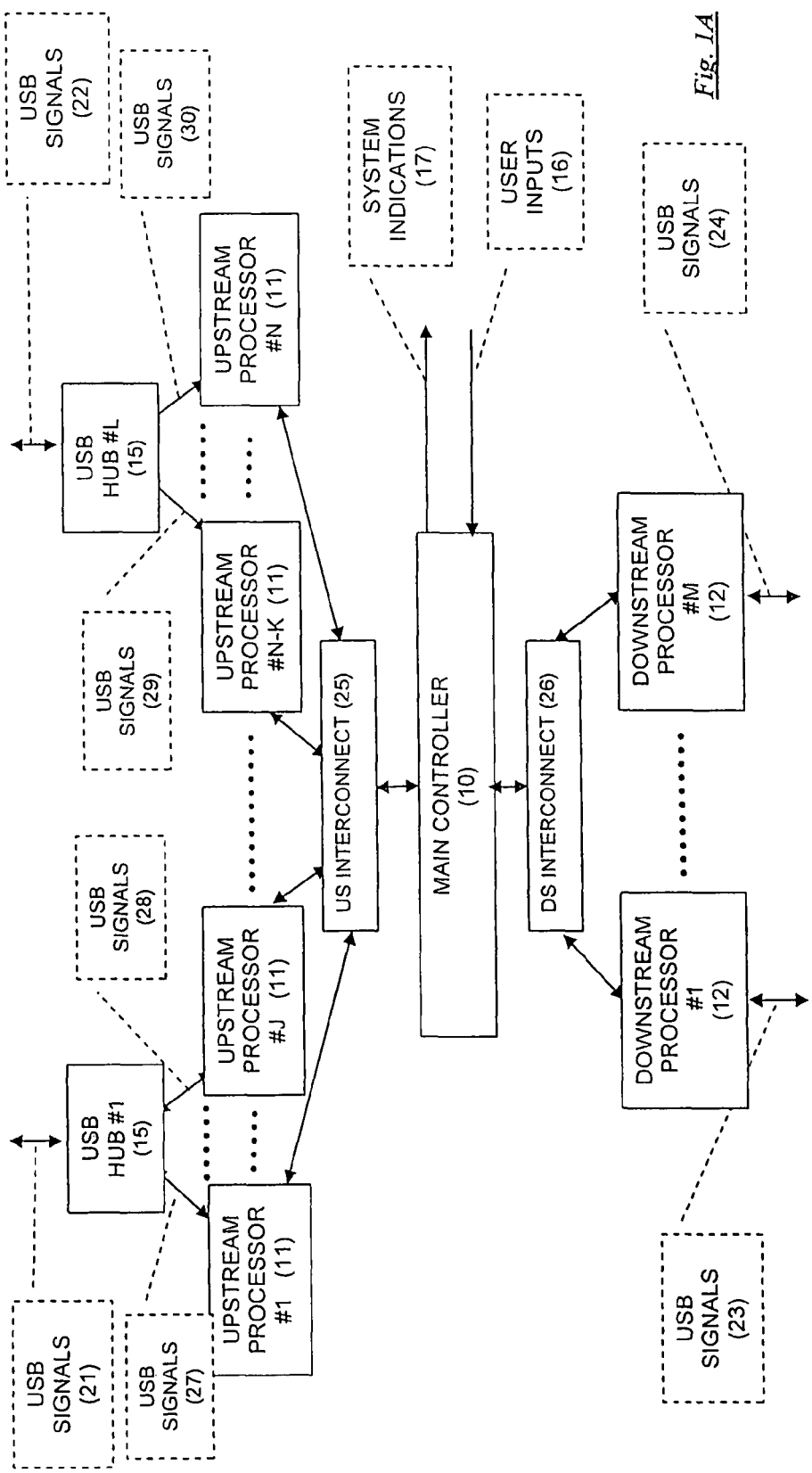
FIG. 1A is a block diagram of a system in accordance with an embodiment of the present invention.

To allow a group of USB devices to be connected to the same host, standard USB hubs can be incorporated into the system in accordance with an embodiment of the present invention as shown in FIG. 1A. FIG. 1A shows the hubs (15) grouping several Upstream Processors (11) into one physical connection to an USB host. The hubs connect to USB hosts via USB signals (21) and (22). USB signals to each USB host are individual for that host. US Processors (11) connect to hubs (15) via USB signals (27), (28), (29) and (30). It will be understood by one skilled in the art that the number of US Processors (11) connecting to each hub (15) and the number of hubs (15) can be more or less than the number shown in FIG. 1A.

Referring to FIG. 1, on initial power-up, the US Processors (11) assert the SE0 state on their USB data lines, indicating that no device is connected. The DS processors (12) begin to examine the state of their USB lines for indication that a peripheral is connected. When a device or hub is attached to a DS processor (12), an examination is performed to determine the class of peripheral that was attached, and to obtain basic data about the peripheral. If a hub has been attached, it is enumerated, an address is assigned, and periodic status requests are started to determine if a peripheral is attached to one of the hub's ports. When it is determined that a peripheral has been attached to one of the ports, the examination is repeated. This process continues until the USB specification limit of hubs connected in series to one another has been reached or until a device is attached. Similar to hubs, an examination of the device is performed to obtain basic data about the device, including its speed, and an address is assigned to the device. At this point, the Main Controller (10) looks up the identification of the US Processor (11) to which this particular DS Processor (12), and thereby the USB device just attached, should be connected. The connection between downstream and upstream is usually specified by a user of the invention via User Inputs signals (16), but can be specified by other means as will be apparent to one skilled in the art. The Main Controller (10) maintains the specified connections in a Connection Map (65), in FIG. 4. The Main Controller (10) looks up the proper US Processor (11) and if an USB host is present, the Main Controller commands the US Processor (11) to signal plug-in and speed by removing the SE0 state from the USB data lines by making the D+line positive for full or high speed devices, or the D−line positive for low speed devices. Removing the SE0 state indicates attachment of a device causing the host to initiate its enumeration process.

Figure 5:
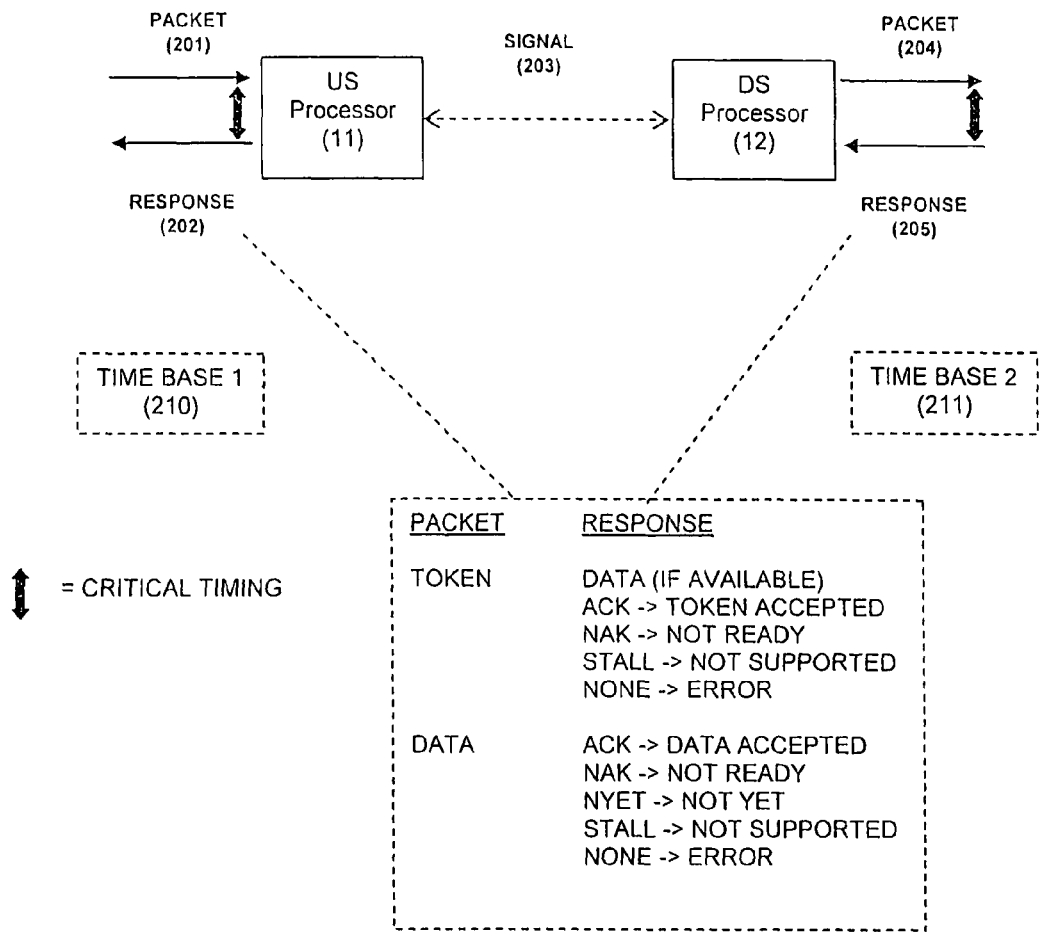
FIG. 5 is a signal diagram of a Downstream to Upstream transfer in accordance with an embodiment of the present invention.

When the US Processor (11) detects an USB reset signal and has been conditioned by the Main Controller (10) to respond as a high speed device, it will issue a high-speed Chirp K signal. If the host or the upstream hub to which the US Processor (11) is connected, is high speed capable, it detects this signal and initiates its high-speed chirp sequence of alternating Chirp J and Chirp K, in accordance with USB Specification paragraphs 7.1.5 and 7.1.7, to indicate that it is high-speed capable. If the US Processor (11) does not see the response from the host as given above, it remains in full speed mode. After the negotiation about speed, the USB host will issue a sequence of Control Transfers, called enumeration, to establish the capabilities of the attached device. Responses to host transmissions have to meet tight USB specification timing requirements. These responses are supplied by the US Processor (11) within the USB Specification time constraints, and not by the actual device connected to the DS Processor (12), thereby decoupling time-wise the actual device from the host, and allowing the enhancements to USB applications of the invention to be implemented. With reference to FIG. 5, which illustrates time decoupling between the host (upstream) and device (downstream), after the DS Processor (12) detects attachment of a device, it initiates SOF's every 125 microseconds if the device is high speed, every millisecond if the device is full speed or an EOP signal every millisecond if the device is low speed, establishing Time Base 2 (211). When the USB host detects the removal of the SE0 state from the upstream USB data lines by the US Processor (11), indicating attachment, the USB host initiates SOF's every 125 microseconds if the US Processor (11) signaled high speed, every millisecond if full speed or an EOP signal every millisecond if low speed, establishing Time Base 1 (210). Time Base 1 (210) is independent from Time Base 2 (211). When a packet (201) is received by the US Processor (11), the US Processor (11) is able to provide the appropriate response within the timing specifications of the USB specification irrespective of communication time between the US Processor (11), the DS Processor (12) and the device. If the packet is a token of the type IN, requesting data from the device, the US Processor (11) either provides data if it has the data or a NAK response if it does not have data, in either case satisfying the host. The US Processor (11) also signals the DS Processor (12) via signal (203) that it has received a packet from the host directed at the device. Signal (203) contains information about the type of packet that was received by the US Processor (11). The communications method used for signal (203) can be the most suitable for the intended application, and can include fiber optic communications, Ethernet, TCP/IP, and other methods suitable for significant distance separation between the US Processor (11) and the Main Controller (10), and local bus interface circuitry. FIG. 5 omits the Main Controller (10) for clarity. When the DS Processor (12) receives signal (203), it reformats the packet into USB signals and sends it to the device. The device response (205) can be data, if the packet was a token of the type IN. The DS Processor (12) then sends the received data via signal (203) to the US Processor (11). The data provided by the actual device is now available for transmission to the host at the next request for data by the host.

Figure 2:
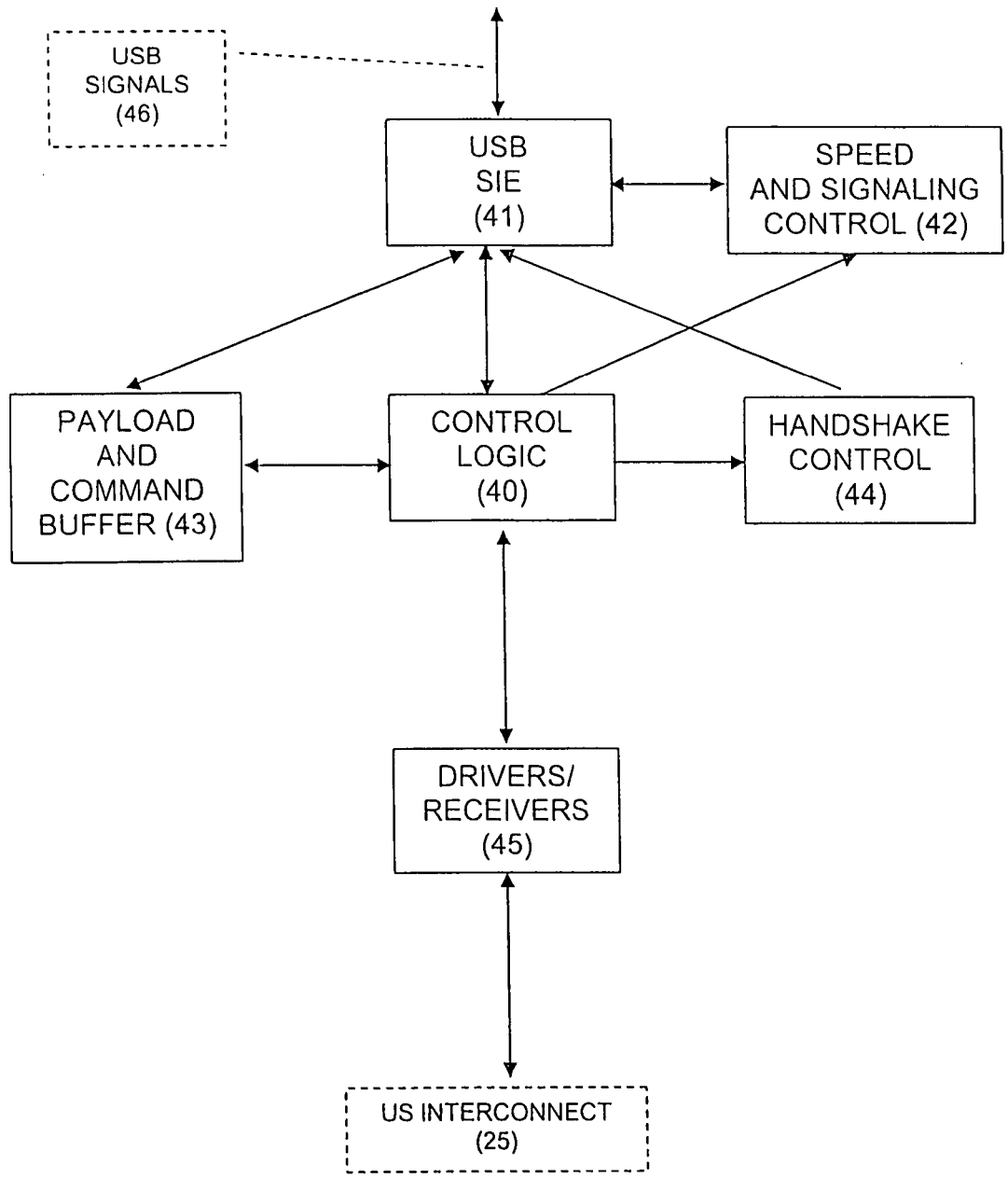
FIG. 2 is a block diagram of the Upstream Processor in accordance with an embodiment of the present invention.
Figure 6:
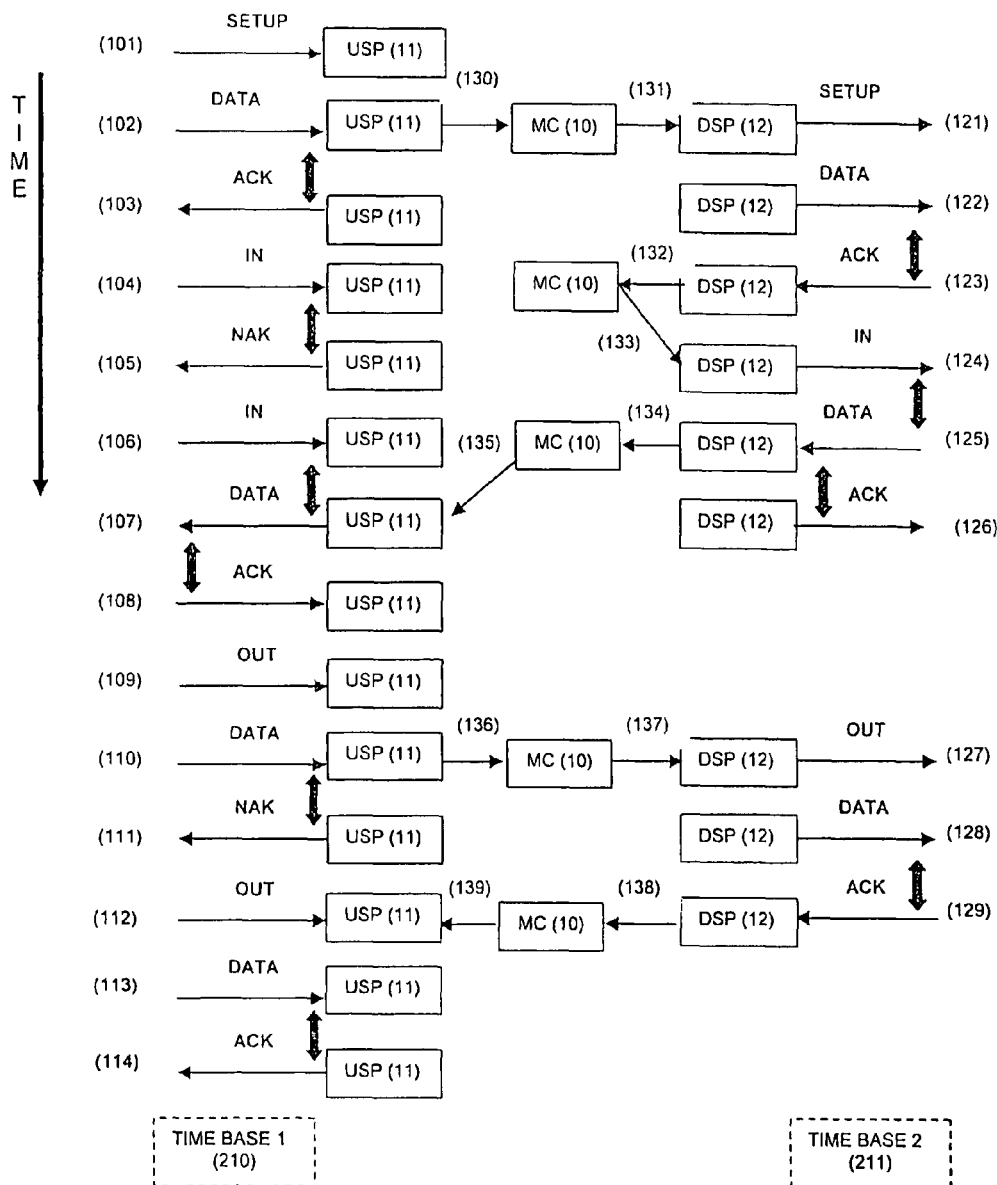
FIG. 6 is a sequence diagram of a Control Read transfer in accordance with an embodiment of the present invention.

The method of time decoupling which provides the enhancements to USB applications by the current invention is further detailed in FIG. 6, which illustrates a Control Read transfer type as practiced by the invention. When the US Processor (11) receives a Setup request (101) from the host, it decodes the packet as a Setup-type packet and makes itself ready to accept the following data packet (102). Details of the US Processor (11) are shown in FIG. 2 and are presented later. The US processor (11) issues a handshake signal (103), ACK as required by the USB specification and within the timing requirements of the USB Specification. The US processor (11) notifies the Main Controller (10) via signal (130) that the Setup packet and its data have been received. The Main Controller (10) acquires the data of the Setup packet from the US Processor (11) via signal (130) and sends it to the DS processor (12) via signal (131), indicating that this is a Setup packet and the specifics of the Setup packet. The DS Processor (12) sends a Setup packet (121) and its data (122) to the device via USB signaling. The device sends an ACK response (123) within the time required by the USB Specification. FIG. 6 shows that the communications between the host and the US Processor (11) and between the DS Processor (12) and the device follow different time bases, Time Base 1 (210) for communications between host and US Processor (11) and Time Base 2 (211) for communications between DS Processor (12) and device. The two time bases are independent. In a Control Read transfer type the host follows the Setup and its data packet with an IN request (104). The time between the host receiving the handshake ACK (103) and sending the IN (104) depends on the particular host and is not specified in the USB Specification. The US Processor (11) responds with a NAK (105) handshake, since it has not yet received data from the device, to the IN request (104) from the host within the timing requirements of the USB Specification. After the DS Processor (12) has received the ACK (123) from the device, it notifies the Main Controller (10) via signal (132). The Main Controller (10), having interpreted the Setup packet received via signal (130) as a Control Read, commands the DS Processor (12) via signal (133) to issue an IN request (124) to the device. The device will respond with a data packet (125), assuming the device is ready to send data, within the timing requirements of the USB Specification. If the device is not ready, it will respond with a NAK. The DS Processor (12) will repeat sending the IN request (124) to the device until it receives data. The DS Processor (12) receives the data packet (125) from the device, sends an ACK (126) handshake to the device within the timing requirements of the USB Specification, and sends the data from the device to the Main Controller (10) via signal (134). The Main Controller (10) presents the data to the US Processor (11) via signal (135). The US Processor (11) marks that it has data and on the next IN request (106) from the host sends a data packet (107) to the host, the said data packet containing the data obtained from the device by the DS Processor (12) from the data (125) sent by the device. Thereby the host receives data obtained from the actual device within the timing requirements of the USB specification on the host side. After receiving the data (107) from the US Processor (11) the host sends an ACK (108) handshake to the US Processor (11). Assuming that the Control Read transfer type used to illustrate the method of time decoupling of the invention, and shown in FIG. 6, requires one data packet, the host will initiate the Status stage of the Control Read transfer by sending an OUT packet (109) to the US Processor (11) followed by a zero-length data packet (110). The time between the host sending the handshake ACK (108) and sending the OUT (109) depends on the particular host and is not specified in the USB Specification. The US processor (11) receives the OUT (109) packet and the zero-length data packet (110) and issues a handshake signal (111), NAK, within the timing requirements of the USB Specification, indicating to the host that it is not yet ready to reply to the Status stage. The US Processor (11) notifies the Main Controller (10) via signal (136) that the host has initiated the Status stage of the Control Read transfer. The Main Controller (10) commands the DS Processor (12) via signal (137) to initiate the Status stage of the Control Read transfer on the device side. The DS Processor (12) issues an OUT packet (127) to the device followed by a zero-length data packet (128). The device receives the OUT (127) packet and the zero-length data packet (129) and issues a handshake signal (129), ACK in the case when both the Setup and data packets were received correctly by the device and the Setup request was supported by the device, within the timing requirements of the USB Specification on the device side, thereby terminating the Control Read transfer on the device side. The DS Processor (12) notifies the Main Controller (10) via signal (138) that an ACK was received from the device, and the Main Controller (10) notifies the US Processor (11) via signal (139). The host issues another OUT (112) packet followed by a zero-length data packet (113). The US processor (11) receives the OUT (112) packet and the zero-length data packet (113) and issues a handshake signal (114), ACK, thereby terminating the Control Read transfer on the host side.

Figure 6A:
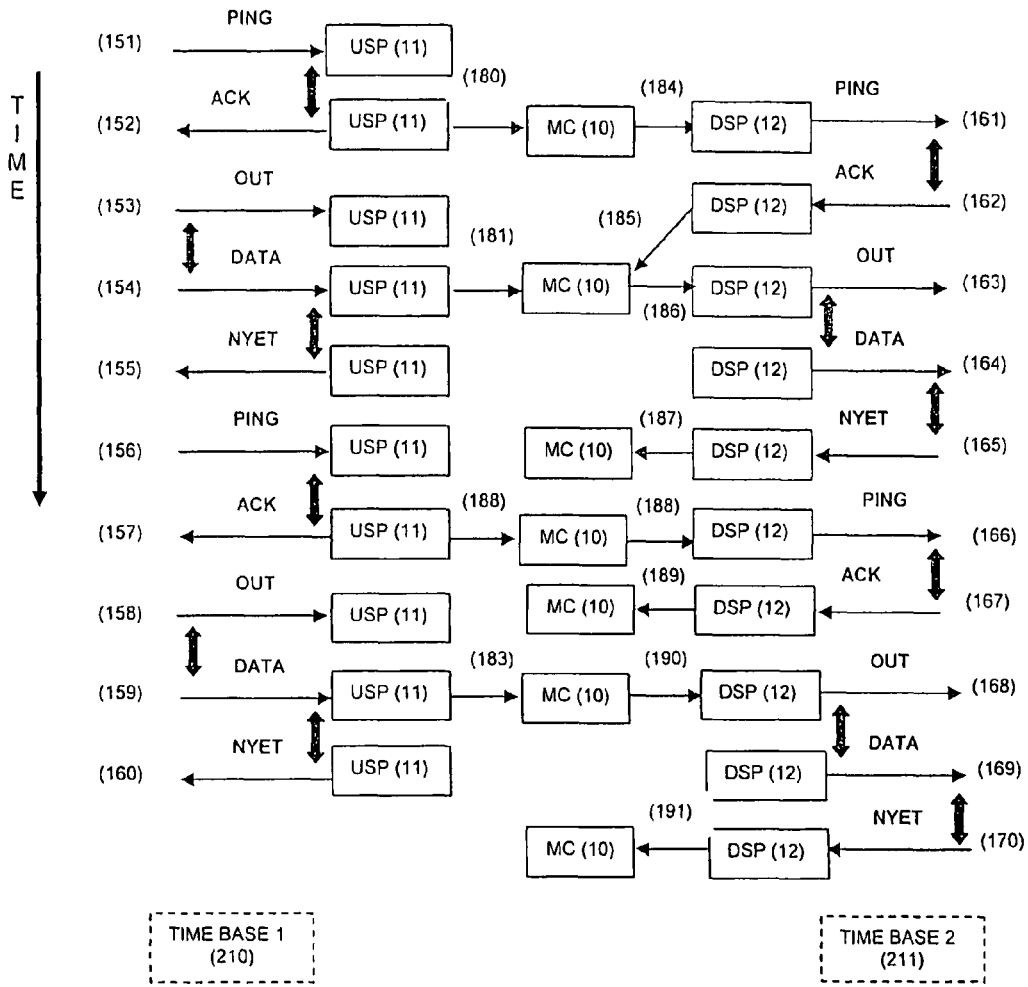
FIG. 6A is a sequence diagram of a high speed Bulk Out transfer in accordance with an embodiment of the present invention.

The method of time decoupling which provides the enhancements to USB applications by the current invention is additionally detailed in FIG. 6A, which illustrates a high speed Bulk Out transfer type, consisting of two data packet transmissions, as practiced by the invention. When the US Processor (11) receives a Ping packet (151) from the host, it decodes the packet as a Ping packet and checks its buffers for available space. Details of the US Processor (11) are shown in FIG. 2 and are presented later. In the example of FIG. 6A, space is available and the US processor (11) issues an ACK handshake signal (152) within the timing requirements of the USB Specification. The US processor (11) notifies the Main Controller (10) via signal (180) that a Ping packet has been received. The Main Controller (10) notifies the DS processor (12) via signal (184) to issue a Ping packet to the device. The DS Processor (12) issues a Ping packet (161) to the device via USB signaling. The device sends an ACK response (162) within the time required by the USB Specification given that it has space for Bulk Out data. FIG. 6A shows that the communications between the host and the US Processor (11) and between the DS Processor (12) and the device follow different time bases, Time Base 1 (210) for communications between host and US Processor (11) and Time Base 2 (211) for communications between DS Processor (12) and device. The two time bases are independent. In a high speed Bulk Out transfer type the host follows the Ping packet with an OUT packet (153) and a data packet (154). The time between the host receiving the handshake ACK (152) and sending the OUT (153) depends on the particular host and is not specified in the USB Specification. The US Processor (11) responds with a NYET (155) handshake to the OUT-data transmission sequence from the host within the timing requirements of the USB Specification. The US processor (11) notifies the Main Controller (10) via signal (181) that Out data has been received. The Main Controller (10) sends the Out data to the DS processor (12) via signal (186). The Main Controller (10) has been notified by the DS Processor (12) via signal (185) that the device has responded with an ACK to a Ping inquiry, indicating it is ready to accept Out data. When the DS Processor (12) receives the Out data via signal (181), it issues to the device an OUT packet (163) followed by a data packet (164) via USB signaling. The device sends a NYET response (165) within the time required by the USB Specification indicating that it received the data correctly, but is not yet ready to accept another data packet. After the DS Processor (12) has received the NYET (165) from the device, it notifies the Main Controller (10) via signal (187). The Main Controller records that a NYET (165) has been received from the device. The host, having received a NYET handshake (155) to its previous OUT packet (153) and data packet (154), issues a Ping packet (156). The US Processor (11) decodes the packet as a Ping packet and since space is available issues an ACK handshake signal (157) within the timing requirements of the USB Specification. The US processor (11) notifies the Main Controller (10) via signal (182) that a Ping packet has been received. The Main Controller (10) notifies the DS processor (12) via signal (188) to issue a Ping packet to the device. The DS Processor (12) issues a Ping packet (166) to the device via USB signaling. The device sends an ACK response (167) within the time required by the USB Specification given that it has space for Bulk Out data. The DS Processor (12) notifies the Main Controller (10) via signal (189) that the device is ready to accept more data. The host, having received an ACK handshake (157) to its Ping inquiry (156) sends the second OUT packet (158) followed by a data packet (159). The time between the host receiving the handshake ACK (157) and sending the OUT (158) depends on the particular host and is not specified in the USB Specification. The US Processor (11) responds with a NYET (160) handshake to the OUT-data transmission sequence from the host within the timing requirements of the USB Specification. The Bulk Out transfer is now completed. The US processor (11) notifies the Main Controller (10) via signal (183) that Out data has been received. The Main Controller (10) sends the Out data to the DS processor (12) via signal (190). The Main Controller (10) has been notified by the DS Processor (12) via signal (189) that the device has responded with an ACK to a Ping inquiry, indicating it is ready to accept Out data. When the DS Processor (12) receives the Out data via signal (190), it issues to the device an OUT packet (168) followed by a data packet (169) via USB signaling. The device sends a NYET response (170) within the time required by the USB Specification indicating that it received the data correctly, but is not yet ready to accept another data packet. After the DS Processor (12) has received the NYET (170) from the device, it notifies the Main Controller (10) via signal (191). The Main Controller records that a NYET (191) has been received from the device. This example considered the case where the Bulk Out data transfer consists of two data packets. Therefore, after receiving the NYET (160) handshake, which indicates that data was received correctly, from US Processor (11) the host has satisfactorily completed the high speed Bulk Out transfer and further communications from the host are for other transfers.

Figure 1B:
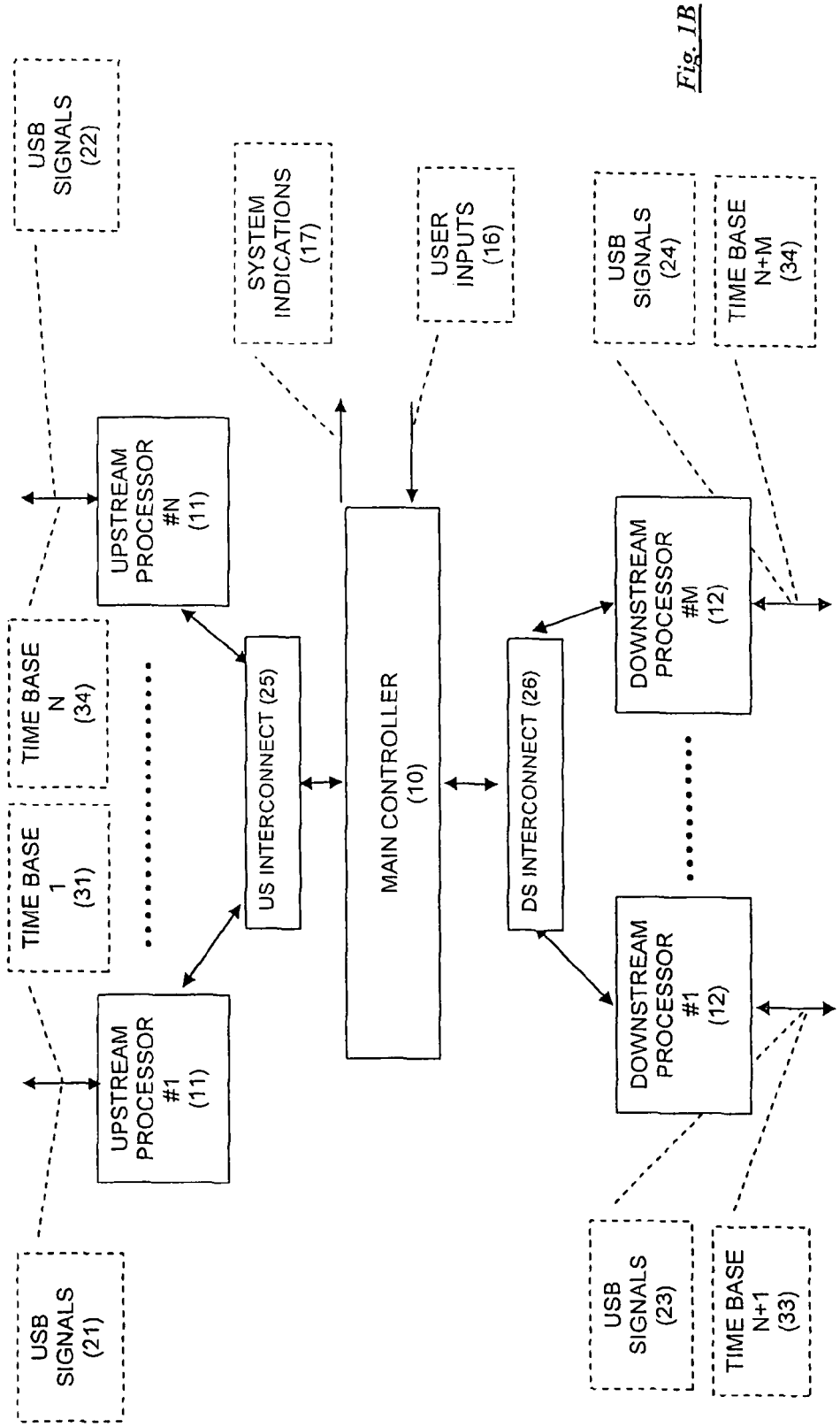
FIG. 1B is a block diagram of a system in accordance with an embodiment of the present invention showing independent time bases.

Upstream and downstream timing independence as practiced by the invention, and as demonstrated by the examples in FIG. 6 and FIG. 6A, applies among all the US Processors (11) and the DS Processors (12). Referring to FIG. 1B, USB signals (21) of US Processor (11) #1 are on Time Base 1 (31). USB signals (22) of US Processor (11) # N are on Time Base N (32). USB signals (23) of DS Processor (11) # 1 are on Time Base N+1 (33), and USB signals (24) of DS Processor (11) # M are on Time Base N+M (34). Time bases 1 (31), N (32), N+1 (33) and M (34) are all independent from each other. There are thus N+M independent time bases. It will be understood by one skilled in the art that the number of independent time bases depends on the number of US Processors (11) and the number of DS Processors (12) and can be more or less than the number shown in FIG. 1B.

FIG. 2 is a detailed a block diagram of the US Processor (11) in accordance with an embodiment of the present invention. The Serial Interface Engine (SIE) (41) receives and generates USB signals (46) from and to an USB host. The SIE (41) converts received USB signals (46) to a form used within the US Processor (11). The SIE (41) also generates USB signals (46) to the USB host, converting from form used within the US Processor (11) to USB signaling form. Once a packet has been received from the host, the SIE (41) records the packet and the data, if any is associated with the packet, in the Payload and Command Buffer (PCB) (43) and advises the Control Logic (40). Control Logic (40) sends the information in the PCB (43) to the Main Controller (10) via Drivers/ Receivers (45) and US Interconnect (25). One skilled in the art will appreciate that the Drivers/Receivers (45) and US Interconnect (25) are optimized for particular communications methods with the Main Controller (10), which can include fiber optic communications, Ethernet, TCP/IP, and other methods suitable for significant distance separation between the US Processor (11) and the Main Controller (10), and can include local bus interface circuitry. The SIE (41) generates handshake signals required by the USB Specification to stay within the timing requirements of the USB Specification. The SIE (41) uses information from the Handshake Control (HC) (44) to determine the type of handshake signal to generate if the packets received from the host are not in error. If the packets are in error, the SIE (41) does not place the received data in the PCB (43) and does not advise the Control Logic (40) that a packet was received. It also does not generate a handshake response. If Control Logic (40) has placed valid data in the PCB (43) it conditions the HC (44) to indicate to the SIE (41) to send the data if an IN packet for the endpoint is received from the USB host. Control Logic (40) also independently manages data toggle synchronization insuring correct data transmission to the USB host. If there is no valid data in the PCB (43), the HC (44) indicates to the SIE (41) to respond with a NAK signal. The Control Logic (40) coordinates data and command communications with the Main Controller (10) via the Drivers/Receivers (DR) (45). The Control Logic (40) also coordinates handshake generation and evaluation using information received from the Main Controller (10), the SIE (41) and information contained in the PCB (43). Speed Signaling and Control (SSC) (42) controls special states of the USB signals (46). After initial power-up, SSC (42) signals state SE0 on the USB signals (46), indicating that no device is attached to the host. When commanded by the Main Controller (10), via signals received through the DR (45) and Control Logic (40), SSC (42) removes the SE0 state from the USB signals (46) and signals the speed commanded by the Main Controller (10) by connecting either the D− or D+line to a positive voltage. In the case the Main Controller (10) has commanded high speed, the SSC (42) looks for the USB reset signal on the USB signal lines (46). When this signal is detected by SSC (42), it starts the Chirp K sequence specified by the USB specification to indicate that it is a high speed device and to determine if the host supports high speed. If the host answers with a Chirp K, Chirp J sequence, as specified in USB Specification paragraphs 7.1.5 and 7.1.7, SSC (42) informs Control Logic (40) that a high speed host is present. Control Logic (40) in turn informs the Main Controller (10) via the DR (45) that a high speed host is present. If SSC (42) does not receive the proper Chirp K, Chirp J sequence in response, it remains a full speed device, and informs Control Logic (40) that a high speed host is not present. Control Logic (40) in turn informs the Main Controller (10) via the DR (45) and US Interconnect (25) that a high speed host is not present. SSC (42) monitors the USB signal lines (46) for the presence of bus activity, indicated by SOF or EOP signals. If these signals are not present, SSC (42) informs Control Logic (40) that bus activity is not present. Control Logic (40) in turn informs the Main Controller (10) via DR (45) that bus activity is not present. When bus activity resumes, SSC (42) detects the resumption and informs the Main Controller (10) via Control Logic (40) and DR (45). SSC (42) also controls the SIE (41) to issue resume signaling when commanded by Control Logic (40). Control Logic (40) in each US Processor (11) autonomously coordinates actions of the circuits comprising each US Processor (11) using information received from the Main Controller (10) as needed, thereby providing timing independence from other US Processors (11) and from DS Processors (12).

Figure 3:
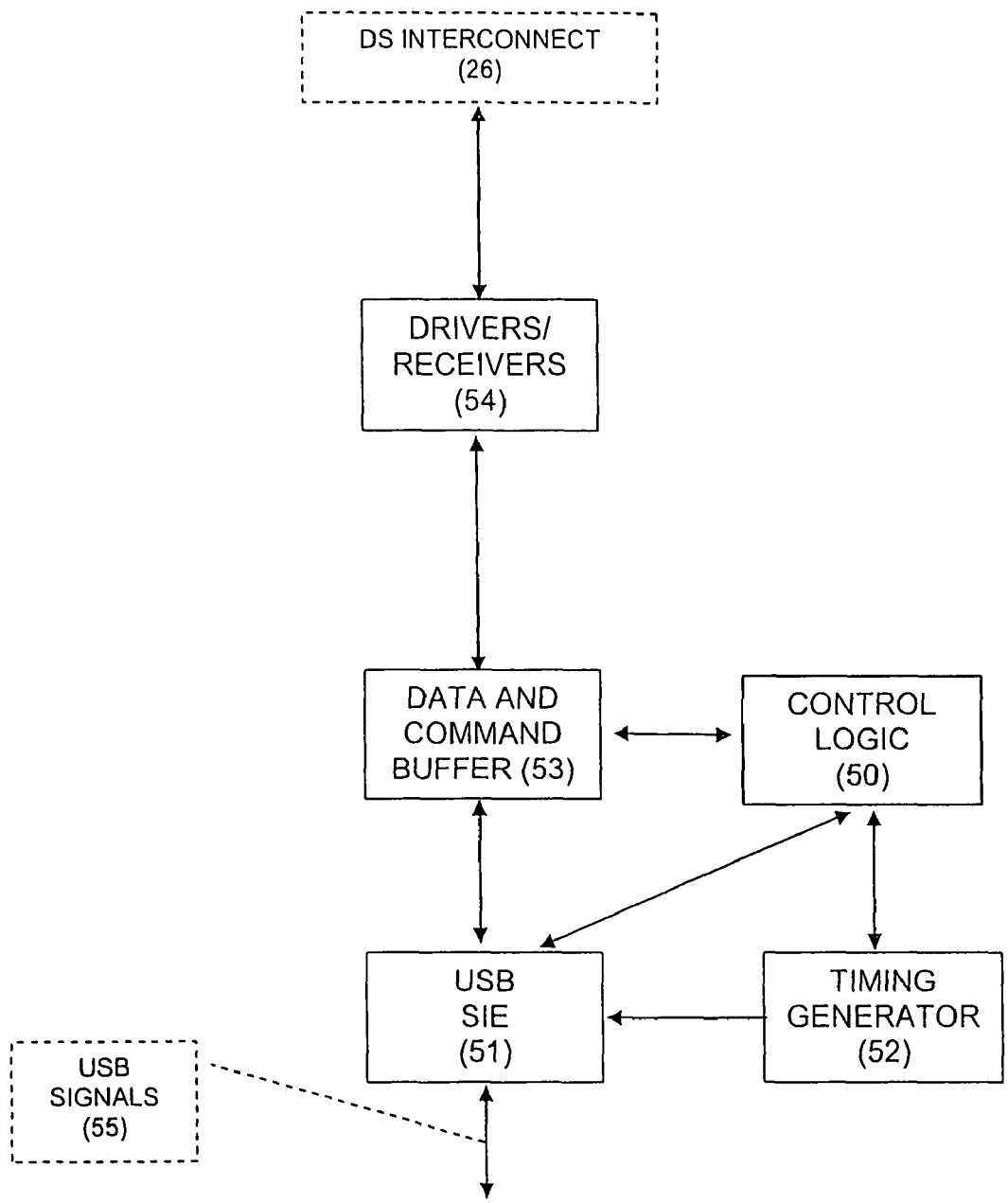
FIG. 3 is a block diagram of the Downstream Processor in accordance with an embodiment of the present invention.

FIG. 3 is a detailed a block diagram of the DS Processor (12) in accordance with an embodiment of the present invention. The Serial Interface Engine (SIE) (51) receives and generates USB signaling (55) from and to the device. The SIE (51) converts received USB signals (55) to a form used within the DS Processor (12). The SIE (51) also generates USB signals (55) to the device, converting from form used within the DS Processor (12). Once a packet has been received from the device, the SIE (51) records the packet in the Data and Command Buffer (DCB) (53), places the data, if any is associated with the packet in the DCB (53) and advises Control Logic (50). Control Logic (50) sends the information in the DCB (53) to the Main Controller (10) via Drivers/Receivers (54) and DS Interconnect (26). One skilled in the art will appreciate that the Drivers/Receivers (54) and DS Interconnect (26) are optimized for particular communications methods with the Main Controller (10), which can include such methods as fiber optic communications, Ethernet, TCP/IP, and other methods suitable for significant distance separation between the DS Processor (12) and the Main Controller (10), and can include local bus interface circuitry. The SIE (51) also generates handshake signals to the device required by the USB Specification within the timing requirements of the USB Specification. The Control Logic (50) coordinates data and command communications with the Main Controller (10) via the Drivers/Receivers (DR) (54) and DS Interconnect (26). After initial power-up, Control Logic (50) checks the state of USB signals (55) as detected by the SIE (51). If no peripheral is attached, the SE0 state exists on the USB signals (55). When a peripheral is attached to the USB signals (55), the SE0 state changes in accordance with the speed of the attached peripheral, with the D−line assuming a positive voltage if a low speed peripheral has been attached and the D+line assuming a positive voltage if a full or high speed peripheral has been attached. If attachment of a full speed peripheral is indicated, Control Logic (50) commands the SIE (51) to issue an USB reset signal on the USB signal lines (55). When this signal is detected by a high speed peripheral, it starts the Chirp K sequence specified by the USB specification in paragraphs 7.1.5 and 7.1.7 to indicate that it is a high speed device. If the SIE (51) signals the Control Logic (50) that the Chirp K sequence has been detected on the USB signal lines (55), Control Logic (50) commands the SIE (51) to answer with a Chirp K, Chirp J sequence. If the Chirp K sequence is not detected by the SIE (51) in response to the USB reset signal, it indicates that a full speed device has been attached. Control Logic (50) informs the Main Controller (10) via the DR (54) that a peripheral has been attached and the speed of the peripheral. Control Logic (50) commands the Timing Generator (TG) (52) to start SOF or EOP signals in accordance with the speed of the attached peripheral. If the attached peripheral is high speed, SOF's are generated every 125 microseconds, each SOF defining the beginning of a microframe. If the attached peripheral is full speed, SOF's are generated every millisecond. If the attached peripheral is low speed, an EOP signal is generated every millisecond. Timing Generators (52) in each DS Processor (12) autonomously maintain frame or micro-frame timing on the USB signals (55) providing a time base independent from other DS Processors (12) and from US Processors (11). Control Logic (50) uses Timing Generator (52) to check that no babble condition exists on USB signals (55). Control Logic (50) also uses Timing Generator (52) to time manage information to and from attached devices by using maximum payload information of the device, or length of data intended for the device, to calculate if there is enough time for the complete transfer in the current frame, or microframe if the recipient device is high speed. If there is not, the transfer is delayed until the next frame or microframe. After the speed of the attached peripheral has been determined, the Main Controller (10) commands Control Logic (50) via DR (54) to perform a partial enumeration to obtain basic information about the attached peripheral, such as whether it is a hub or not, and the maximum payload of the device. Further details of this process are provided in the description of the Main Controller (10). At the conclusion of this process the Main Controller (10) has determined if the attached peripheral is a hub or a device. When a peripheral is detached, USB signals (55) assume the SE0 state. When Control Logic (50) detects that the SIE (51) has found the SE0 state, indicating peripheral detachment, it informs the Main Controller (10) via DR (54) that a detach event has occurred at this DS Processor (12). The Main Controller (10) processes the detach event as presented in the description of the Main Controller (10). The Main Controller (10) also monitors Control transfers from the US Processor (11) directed to the DS Processor (12). If an USB host issues a command enabling the Remote Wakeup Feature, it is noted by the Main Controller (10). When subsequently US Processor (11) reports Loss Of Activity, the Main Controller (10) commands the DS Processor (12) to stop generation of the frame timing signals to the USB device. Control Logic (50) commands Timing Generator (52) to stop generation of the frame timing signals to the USB device. The SIE (51) continues to monitor the state of the USB signals (55) and advises Control Logic (50) when resume signaling is detected. Control Logic (50) passes this information to the Main Controller (10) via DR (54). The Main Controller (10) then commands the US Processor (11) to issue resume signaling on its USB signals (46).

Figure 4:
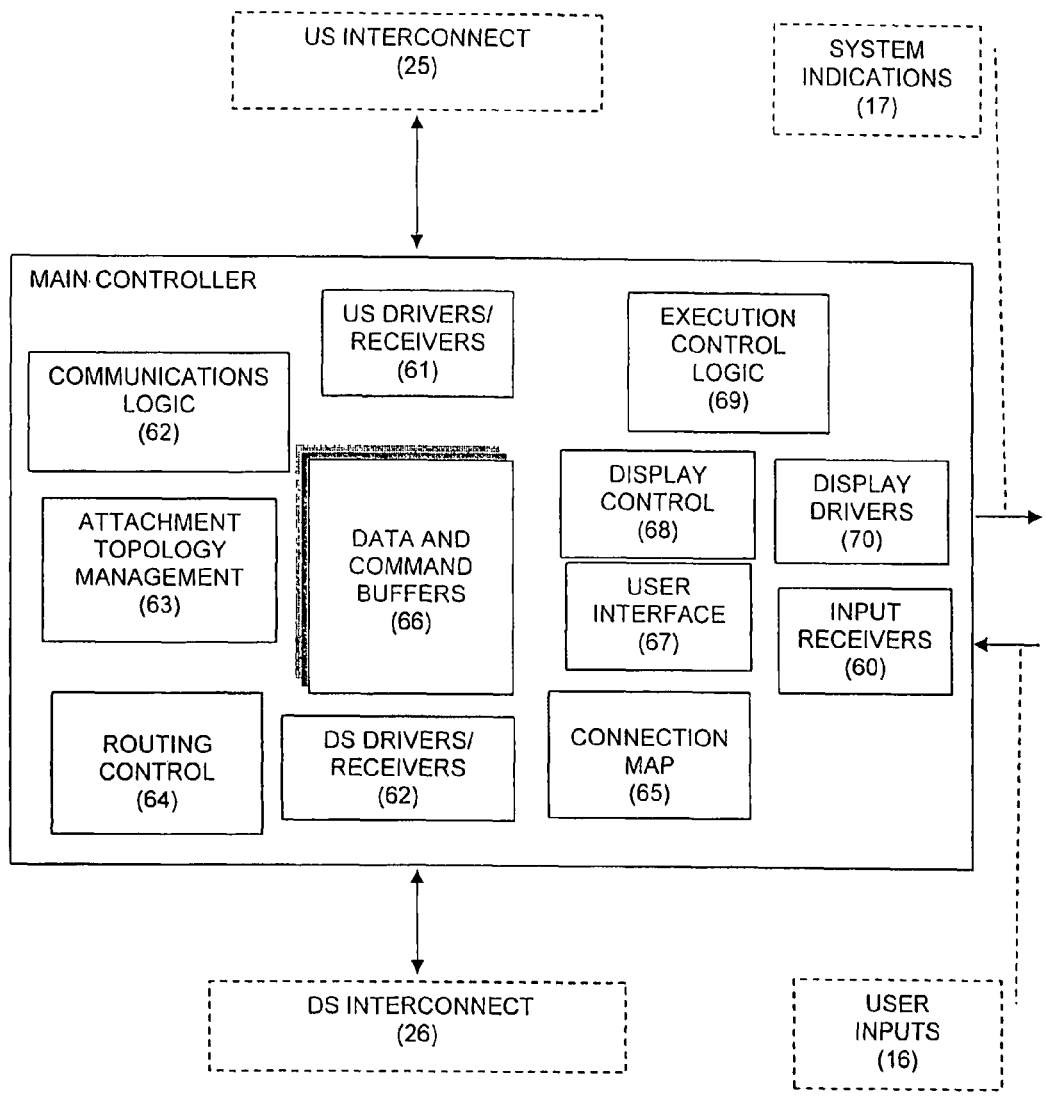
FIG. 4 is a block diagram of the Main Controller in accordance with an embodiment of the present invention.

The Main Controller (10), shown in FIG. 4, coordinates US Processors (11) and DS Processors (12), which are all operating on independent time bases, routes information bidirectionally among the DS Processors (12) and US Processors (11), maintains information about the attachment topology of hubs and devices attached to the DS Processors, and provides facilities for user control and indications. Execution Control Logic (ECL) (69) controls and coordinates other functional components of the Main Controller (10). The Display Drivers (70) perform electrical signal adaptation to match characteristics of a particular display and generate System Indication (17) signals under control of Display Control (68). Display Control (68) derives information from the Connection Map (CM) (65) and from ECL (69). User Inputs (16) are adapted by Input Receivers (60) and further processed by User Interface (67). One of the functions available via the User Interface (67) is switching of devices to hosts. User Interface (67) modifies the CM (65), causing ECL (69) to initiate required switching actions. ECL (69) advises Routing Control (64) of a change in CM (65). CM (65) contains current connection information, relating DS Processors (12) to US Processors (11), and information locking out connection to certain US Processors (11), effectively declaring these US Processors (11) "busy". The "busy" condition may be established dynamically, and may be removed dynamically, among other means, by User Inputs (16), data activity by DS Processors (12) or by other appropriate means. Routing Control (64) uses information in the CM (65), translates it into physical addressing information and directs information flow from/to US Processors (11) and DS Processors (12). In addition to using information in the CM (65), Routing Control (64) examines messages stored in the Data and Command Buffers (DCB) (66) to determine the source, type and content of the messages. Given the source, the information in the CM (65) permits look-up of the destination, or destinations, for the message. Routing Control (64) also remaps device addresses assigned by an USB host, as reported by an US Processor (11), to device addresses assigned to a device by ECL (69). To prevent message misrouting, ECL (69) changes CM (65) data only when DCB (66) is empty. CL (62) manages the protocol layer of communications with the US Processors (11) and DS Processors (12) via US Interconnect (25) and DS Interconnect (26) by controlling the US Drivers/Receivers (61) and the DS Drivers/Receivers (62). In addition to providing the signaling and electrical layer of communications with the US Processors (11) and the DS Processors (12) via US Interconnect (25) and DS Interconnect (26), the US Drivers/Receivers (61) and the DS Drivers/Receivers (62) adapt the signals between the Main Controller (10) and US Interconnect (25) and DS Interconnect (26). A practitioner of ordinary skill in the art will understand that the signals to US Interconnect (25) and DS Interconnect (26) and from US Interconnect (25) and DS Interconnect (26) to the US Processors (11) and the DS Processors (12) may be different from each other in nature, and that they may be of the same nature as the signal levels used by the Main Controller (10). Communications methods can include fiber optic communications, Ethernet, TCP/IP, and other methods suitable for significant distance separation between. the US Processors (11), US Interconnect (25), the Main Controller (10), DS Interconnect (26), and the DS Processors (12), and may include local bus interface circuitry. US Interconnect (25) and DS Interconnect (26) include functionality to select one or more US Processor (11) and one or more DS Processor (12) as a source or destination of information flow between the Main Controller (10) and US Processors (11) and DS Processors (12). In a particular embodiment, US Interconnect (25) and DS Interconnect (26) can be a conventional parallel or serial bus, or can be an arrangement to allow connection separation between the Main Controller (10) and US Interconnect (25) and DS Interconnect (26). The particular embodiment for US Interconnect (25) can be different from or can be the same as the DS Interconnect (26).

After a DS Processor (12) has detected attachment of a peripheral, it reports the event and the speed of the attached peripheral to the Main Controller (10), which commands the DS Processor (12) to perform a partial enumeration to obtain basic information about the attached peripheral, including, but not limited to, whether it is a hub or not, and the maximum payload of the device. If the peripheral is device, ECL (69) uses information in the CM (65) to determine the US Processor (11) to which this device should be attached and commands the US Processor (11) to signal device attachment on its USB signals (46). If the peripheral is a hub, Attachment Topology Management (ATM) (63) data structures are updated. Downstream hub attachment is not reflected upstream, thereby allowing the full configuration of five hubs in series on the upstream, USB host, side. ATM (63) receives and processes reports of peripheral attachment and detachment reported by the DS Processors (12). ATM (63) manages information about the topology of downstream hub and device connections and the addresses of each device and hub. The current downstream attachment topology and address assignment are held in data structures unique for each DS Processor (12) and in global data structures. The information for these data structures is derived in part from reports by DS Processors (12) about peripheral attachment and detachment. The ATM (63) data structures are illustrated in FIGS. 7(a)-(d). The data structures comprises of three types: a) global, which apply to all DS Processors (12), shown in FIG. 7(a) and (b); b) group-oriented, which apply to a group of DS Processors (12), shown in FIG. 7(c); c) individual, which apply to one DS Processor (12), shown in FIG. 7(e). There is one set of global data structures. The number of group-oriented data structures equals the number of groups, which may equal one or more. The number of individual data structures equals the number of DS Processors (12), which may equal one or more. Global data structures are Group Definition (301) and Group List (304), shown in FIG. 7(a) and (b) respectively. Group Definition (301) specifies the number of DS Processors (12) in a group in group_size (302), which may equal one or more, and the number of groups in no_groups (303), which also may equal one or more. The Group List (304) specifies which DS Processors (12) are part of one group. The Group List (304) contains a number of lists equal to the number of groups, specified in no_groups (303). Each list contains identifications of the DS Processors (12) constituting a group. The Device Control (305), FIG. 7(c), data structure contains an element, devices_left_j (317) for each group. Device Control (305) controls the number of devices that can be attached to the DS Processors (12) in one group. Device Control (305) is initialized to group_size (302) on start-up. Each element, devices_left_j (317), is dynamically controlled as devices are attached and detached. There is one set each of the data structure next_address (306) and the Peripheral_Definition_List (PDL) (307), FIG. 7(d), for each DS Processor (12). The PDL (307) entries p_address (310), p_class (311), p_speed (312), higher_hub_address (313), port_no (314), and no_of_ports (315) form one element of the PDL (307). Each element defines one attached peripheral, hub or device. The number of elements dynamically increases and decreases during operation as devices and hubs are attached and detached. The next_address (306) is initialized on power-up to one and is incremented as hubs and devices are attached. It is reset to one when all peripherals have been detached from the DS Processor (12) to whom the next_address (306) data structure applies.

The USB specification handles transmission or signaling errors by requiring that the recipient of a transmission in error not respond with a handshake, except for isochronous transfers, which have no handshake requirement. Absence of a response in time is an indication of error. This type of error can occur at the US Processors (11) or the DS Processors (12). If a US Processor (11) receives a corrupted host transmission, it does not respond, thereby signaling an erroneous reception, and does not pass on the error to the Main Controller (10), isolating the error. The USB host handles the error in the manner it may be programmed. If a US Processor (11) does not receive a required handshake from its USB host, it waits for action from the host. The Main Controller (10) is notified that the transfer was not completed, and of actions taken by the host. If the DS Processor (12) does not receive a response in time for a transmission to a peripheral, it retries the request three times, and reports to the Main Controller (10) if it is not successful. The Main Controller (10) commands the US Processor (11), which is connected to the DS Processor (12) not to respond to further host requests, thereby passing on the device error.

The USB specification also requires all USB-compatible devices to support certain Setup requests from the USB host. Other Setup requests, including Setup requests specified by a USB device vendor, are not required to be supported. If an USB-compliant device receives such an unsupported request, it must reply with a STALL handshake. The STALL response is usually given by an USB-compliant device in the Status stage of a Control transfer. When an US Processor (11) receives a Setup request, it passes the request to the DS Processor (12) as indicated in FIG. 6. The device, instead of responding with an ACK or NAK either in the data stage, if there is one, or in the Status stage, will respond with a STALL, which is passed on to the US Processor (11) connected to the DS Processor (12). Referring to FIG. 6, in such a case the device instead of responding with ACK (129), would reply with a STALL, which would be passed on via signals (138) and (139) to the US Processor (11), which would respond with a STALL instead of ACK (114). In this manner, error conditions at both the US and DS connections are handled properly by the current invention.

FIGS. 8(a)-(e) demonstrate the use of the data structures of the ATM (63) for the attachment topology of FIG. 8(e) comprising of two hubs and two devices, for an embodiment of the present invention defined by Group Definition (301) with a group_size (302) of two and no_groups (303) of one, FIG. 8(a). There are two DS Processors (12) in this example, listed in Group List (304) as ds_1 and ds_2. The topology in FIG. 8(e) arises when a hub, hub_1 (321) in FIG. 8(e), is attached to DS Processor (12) ds_1 (320), followed by attachment of device_1 (323) to port 1 of hub _1 (321), then followed by attachment of hub_2 (322) to port 2 of hub_1 (321), then followed by attachment of device_2 (324) to port 4 of hub_2 (322). Device Control (305), FIG. 8(c) has been initialized to group_size (302), making devices_left (317) equal to two. Attachment of device_1 (323) decrements devices_left (317), making it equal to one. Attachment of device_2 (324) also decrements devices_left (317), making it equal to zero, as shown in FIG. 8(c). When devices_left (317) equals zero, any further attachment events at the DS Processors (12) in the group to which devices_left (317) applies are ignored by ATM (63). When hub_1 (321) is attached, the event is reported to the Main Controller (10) by the DS Processor (12) ds_1 (320). ATM (63) assigns the contents of next_address (306) to the element p_address in PDL (307), making it equal to one, and increments next_address (306), which will equal two. Information about the attached device obtained by DS Processor (12) ds_1 (320) is used to complete the update of the element of the PDL (307) corresponding to the peripheral just attached. Since a hub was attached, p_class (311) will equal 9, the class assigned to hubs by the USB specification. In the example of FIG. 8, hub_1 (321) is a full speed hub, and PDL (307) is updated accordingly. The no_of_ports (315) is set to equal two. Other entries in this element of the PDL (307) remain zero. The element higher_hub_address (313) equal to zero indicates that the peripheral described by this element is attached directly. Similarly, port_no (314) remains zero. When device_1 (323) is attached, the event is reported to the Main Controller (10) by the DS Processor (12) ds_1 (320). ATM (63) assigns the contents of next_address (306) to the element p_address in PDL (307), making it equal to two, and increments next_address (306), which will equal three. Information about the attached device obtained by DS Processor (12) ds_1 (320) is used to complete the update of the element of the PDL (307) corresponding to the peripheral just attached. Since a device, not a hub, was attached, p_class (311) will equal other than 9. In the example of FIG. 8, device_1 (323) is full speed, and PDL (307) is updated accordingly. The no_of_ports (315) remains zero, since a device was attached. The element higher_hub_address (313) equals one, the address of the hub to which attachment took place. The port_no (314) is made equal to one, the port to which the device was attached. Device Control (305) element devices_left (317) is decremented, making it equal to one. When hub_2 (322) is attached, the event is reported to the Main Controller (10) by the DS Processor (12) ds_1 (320). ATM (63) assigns the contents of next_address (306) to the element p_address in PDL (307), making it equal to three, and increments next_address (306), which will equal four. Information about the attached device obtained by DS Processor

(12) ds_1 (320) is used to complete the update of the element of the PDL (307) corresponding to the peripheral just attached. Since a hub was attached, p_class (311) will equal 9, the class assigned to hubs by the USB specification. In the example of FIG. 8, hub_2 (322) is a full speed hub, and PDL (307) is updated accordingly. The no_of_ports (315) becomes equal to four. Other entries in this element of the PDL (307) remain zero. The element higher_hub_address (313) equals one, the address of the hub to which attachment took place. The port_no (314) is made equal to two, the port to which the hub_2 (322) was attached. When device_2 (324) is attached, the event is reported to the Main Controller (10) by the DS Processor (12) ds_1 (320). ATM (63) assigns the contents of next address (306) to the element p_address in PDL (307), making it equal to four, and increments next_address (306), which will equal five. Information about the attached device obtained by DS Processor (12) ds_1 (320) is used to complete the update of the element of the PDL (307) corresponding to the peripheral just attached. Since a device, not a hub, was attached, class will equal other than 9. In the example of FIG. 8, device_2 (324) is low speed. PDL (307) is updated accordingly. The no_of_ports (315) remains zero, since a device was attached. The element higher_hub_address (313) equals three, the address of the hub to which attachment took place. The port_no (314) is made equal to four, the port to which the device was attached. Device Control (305) element devices_left (317) is decremented, making it equal to zero, thereby disallowing processing of additional attachment events.

The use of the ATM (63) data structures in processing detachment can be understood by following detachment of hub_2 (322) in FIG. 8. When hub_2 (322) is detached, DS Processor (12) reports to the Main Controller (10) that a detach event occurred at port 2 of hub_1 (321). ATM (63) searches for PDL (307) higher_hub_address (313) entries equal to one, the address of hub_1 and port_no (314) equal to two for a match. It finds that a four-port hub with address three matches. ATM (63) now checks PDL (307) higher_hub_address (313) entries for a match with three, and finds the match for device with address four. ATM (63) now zeros PDL (307) element entries for the hub, hub_2 (322), and for the device, device_2 (324). It also increments the devices_left (317) structure of Device Control (305), making it one, thereby allowing future attachment of another device to this group, either at DS Processor (12) ds_1 (320) or ds_2. It also causes the Main Controller (10) to signal the US Processor (11) to which device_2 (324) was connected to signal detach by generating USB signal state SE0 on the upstream USB signals. The information identifying the US Processor (11) to which device_2 (324) was connected is found in the CM (65).

Figure 9:
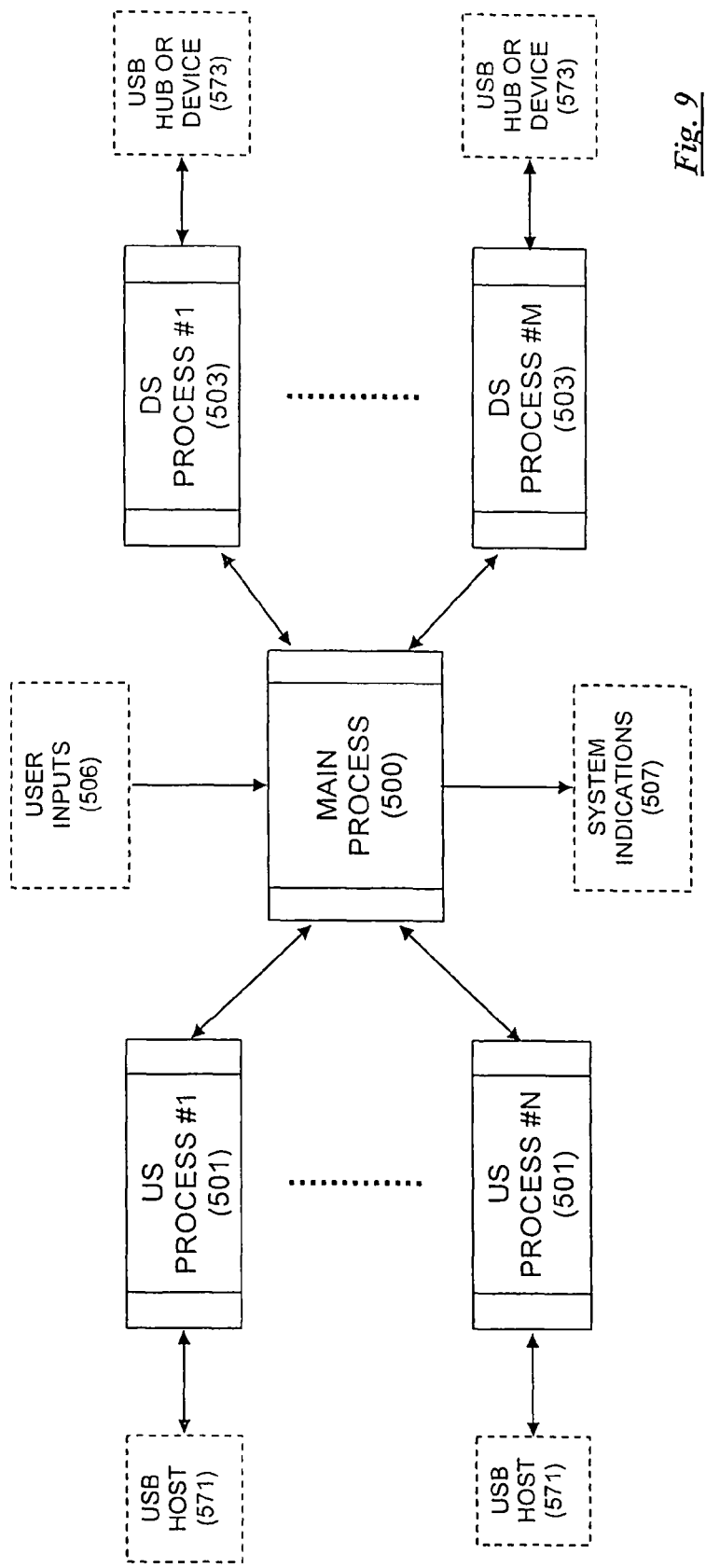
FIG. 9 is a diagram of the major processes in accordance with an embodiment of the present invention.

FIG. 9 shows the structure of the software in accordance with an embodiment of the present invention. A number of US Processes (501) interface with USB hosts (571). A number of DS Processes (503) interface with a number of USB-compatible peripherals, hubs or devices (573). The Main Process (500) controls overall operation, coordinates operation of the other processes and bidirectionally routes information and data among the US Processes (501) and DS Processes (503). The US Processes (501) are identical, with each US Process (501) being an instantiation serving a different USB host (571). The USB host (571) may represent a direct connection to a host's root hub or a port on an US hub. The DS Processes (503) are identical, with each DS Process (503) being an instantiation serving a different DS USB hub or device (573). There may be more than one device serviced by a DS Process (503), the devices connected by a hub or hubs. The USB hosts (571) and USB hubs or devices (573) are not part of the invention and are shown to clarify the application of the present invention. The processes shown in FIG. 9 operate independently, providing time decoupling between the US and DS sides. It will be understood by one skilled in the art that the number of US Processes (501) and the number of DS Processes (503) can be more or less than the number shown in FIG. 9. After power up, all US Processes (501) issue SE0 signaling to the USB hosts (571) indicating detachment. The DS Processes (503) start looking for attachment of USB hub or device (573). When a DS Process (503) detects that a device or hub is attached, it, in cooperation with Main Process (500), determines the class of peripheral that is attached, hub or device, and obtains basic data about the peripheral. If a hub is attached, it is enumerated, including address assignment, and periodic status requests are started to determine if a peripheral is attached to one of the hub's ports. When it is determined that a peripheral has been attached to one of the ports, the examination is repeated. This process continues until the limit of hubs connected to one another in series as specified in the USB specification has been reached or until the number of devices reaches the number allowed for this DS Process (503). Similar to hubs, an examination of an attached device is performed to obtain basic data about the device, including its speed, and an address is assigned to the device. Main Controller (500) looks up the identification of the US Process (501) to which this particular DS Process (503), and thereby the USB device just attached, should be connected. The connection between downstream and upstream is usually specified by a user of the invention via User Inputs (506), but can be specified by other means as will be readily apparent to one skilled in the art. If the connection is active, the SE0 signal state to USB host (571) is removed by a US Process (501) upon command by the Main Process (500) to signal attachment of a device. The Main Process (500) commands an US Process (501) to signal attachment only if a device, not a hub, was attached downstream. In this manner, hub attachment downstream is not reflected upstream, permitting the full configuration of five hubs in series on the upstream side. The USB host (571) upon detecting attachment of a device initiates the enumeration process. If during the process, or at any other time, USB host (571) issues a Setup request that is not supported by the device attached to the DS Process (503), said Setup request having been sent from the US Process (501) to the DS Process (503) via Main Process (500), said Setup request will be acknowledged by the device with a STALL handshake. The STALL handshake response is passed by the DS Process (503) to the Main Process (500), which instructs the US Process (501) to reply with a STALL handshake in the Status stage of the Control transfer that produced a STALL response from the device.

Figure 10:
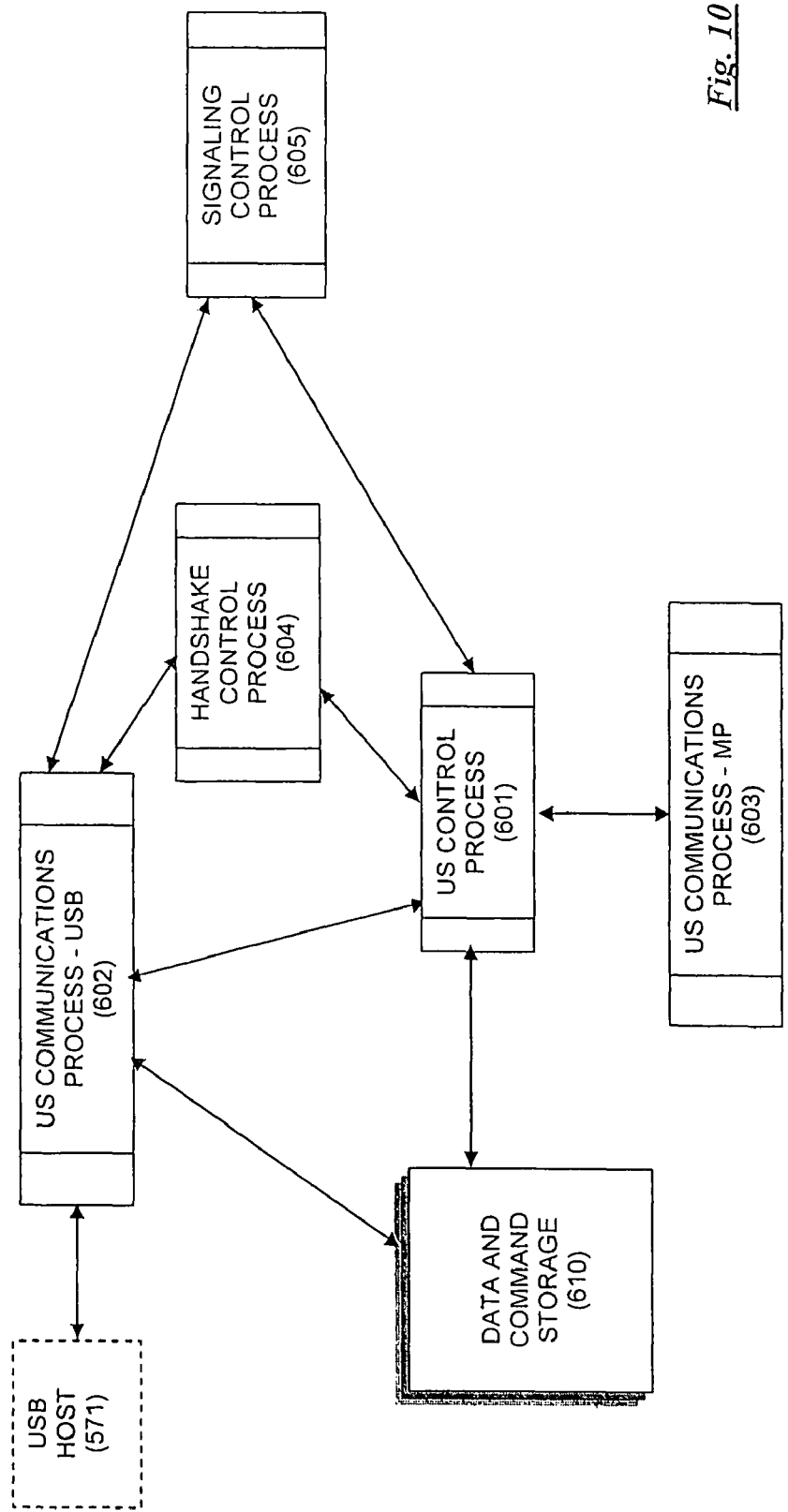
FIG. 10 is a diagram of the processes of the US Process in accordance with an embodiment of the present invention.

FIG. 10 shows the structure of the software of the US Process (501) in accordance with an embodiment of the present invention. The US Communications Process—USB (602) manages USB signaling from and to an USB host (571). Specific signaling situations, such as state SE0 generation, loss of activity detection, chirp and squelch signaling for the high speed case, and resume signaling are also managed by the Signaling Control Process (605). When a packet is being transmitted by the host, the US Communications Process—USB (602) places the packet in the Data and Command Storage (610), places the data, if any is associated with the packet in the Data and Command Storage (610) as well, and advises the US Control Process (601). US Control Process (601) sends the information in the Data and Command Storage (610) to the Main Process (500) making use of the services of the US Communications Process—MP (603). When US Communications Process—MP (603) places data in Data and Command Storage (610) destined for the USB host (571), US Control Process (601) independently manages data toggle synchronization insuring correct data transmission to the USB host (571). The US Communications Process—MP (603) manages communications with the Main Process (500). One skilled in the art will appreciate that the US Communications Process—MP (603) is optimized for particular communications methods with the Main Process (500), which can include fiber optic communications, Ethernet, TCP/IP, and other methods suitable for significant distance separation between the US Process (501) and the Main Process (500), and can include local bus interface circuitry. The Handshake Control Process (604) generates handshake signals required by the USB Specification within the timing requirements of the USB Specification. The Handshake Control Process (604) determines the type of handshake signal to generate if the packets received from the host are not in error. If the received packets are in error, they are not placed in the Data and Command Storage (610), and US Control Process (601) is not advised that a packet was received. USB host (571) does not receive a handshake within the timing requirements of the USB specification, indicating an error in communications, and handles the error condition in accordance with its program. Signaling Control Process (605) controls the state of the USB signals to USB host (571). When commanded by the Main Process (500), via US Control Process (601), Signaling Control Process (605) removes the SE0 state from the USB signals and signals the speed commanded by the Main Process (500). Once attach has been signaled on the USB signals by removing the SE0 state, and USB host (571) issues an USB reset signal, and if the US Control Process (601) has reported high speed, the Signaling Control Process (605) initiates the dialog with the USB host defined in the USB Specification paragraphs 7.1.5 and 7.1.7. If this dialog indicates that a high speed host is present, Signaling Control Process (605) informs US Control Process (600) that a high speed host is present. US Control Process (600) in turn informs the Main Process (500) that a high speed host is present. If Signaling Control Process (605) does not receive the high speed response from the USB host (571), it remains a full speed device, and informs US Control Process (601) that a high speed host is not present, which in turn informs the Main Process (500) that a high speed host is not present. When commanded by Main Process (500), via US Control Process (601), Signaling Control Process (605) also issues resume signaling to the USB host (571). The US Control Process (601) in each US Process (501) autonomously coordinates actions of the processes comprising each US Process (501) using information received from the Main Process (500) as needed, thereby providing timing independence from other US Processes (501) and from DS Processes (503), and allowing the enhancements to USB applications practiced by the present invention.

Figure 11:
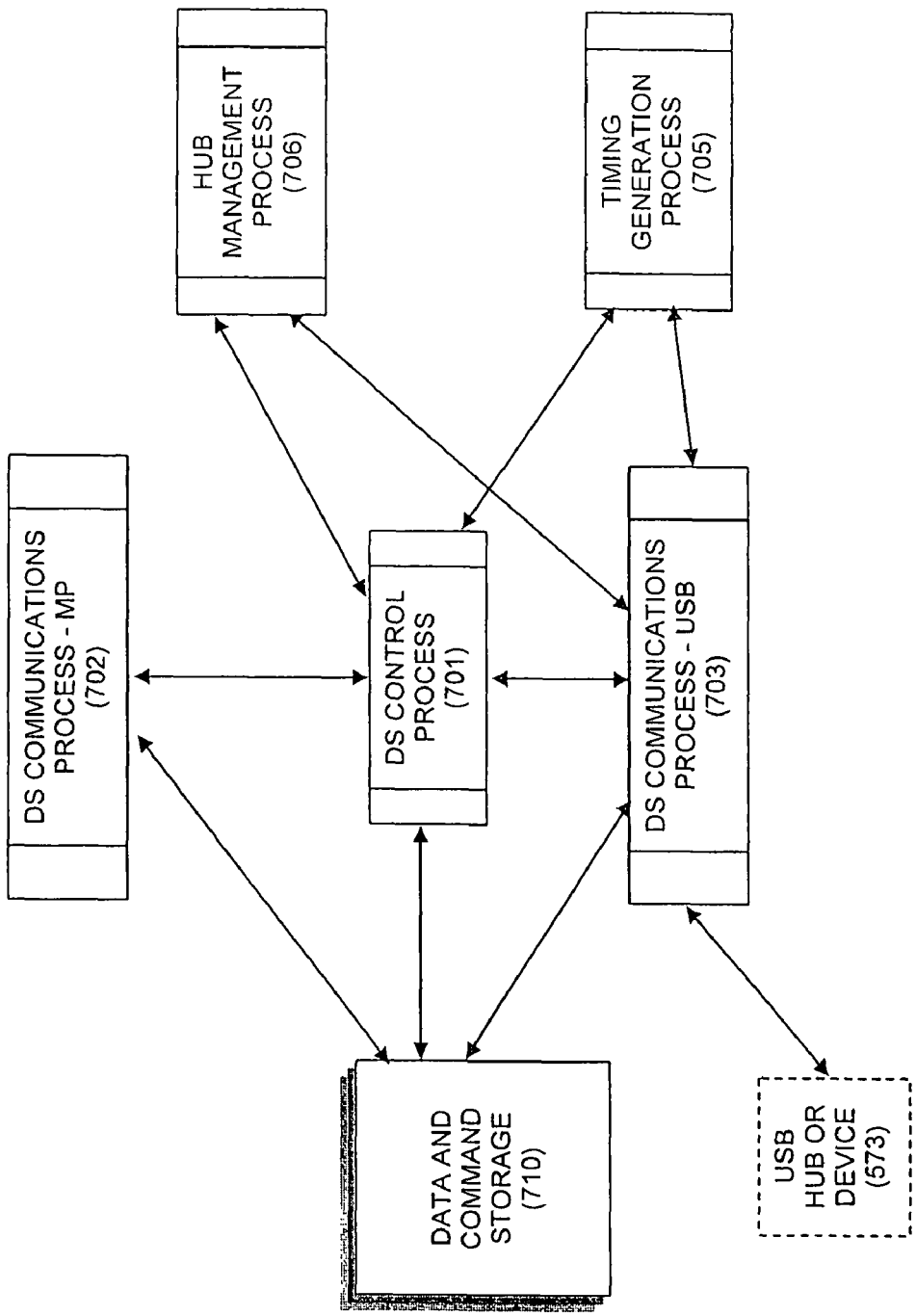
FIG. 11 is a diagram of the processes of the DS Process in accordance with an embodiment of the present invention.

FIG. 11 shows the structure of the software of the DS Process (503) in accordance with an embodiment of the present invention. The DS Communications Process—USB (703) manages USB signaling from and to the USB hub or device (573). Once a packet has been received from the device, the DS Communications Process—USB (703) places the packet in the Data and Command Storage (710), places the data, if any is associated with the packet in the Data and Command Storage (710) as well and advises the DS Control Process (701). DS Control Process (701) sends the information in the Data and Command Storage (710) to the Main Process (500) making use of the services of the DS Communications Process—MP (702). Data and commands destined to the device sent by the Main Process (500) are placed by the DS Communications Process—MP (702) in the Data and Command Storage (710). DS Control Process (701) independently manages data toggle synchronization insuring correct data transmission to the USB hub or device (573). The DS Communications Process—USB (703) generates handshake signals to the USB hub or device (573) within the time required by the timing requirements of the USB Specification. DS Control Process (701) sends the information in the Data and Command Storage (710) to the Main Process (500) making use of the services of the DS Communications Process—MP (702). The DS Communications Process—MP (702) manages communications with the Main Process (500) and accepts data only addressed to the particular DS Process (503). One skilled in the art will appreciate that the DS Communications Process—MP (702) can be optimized for particular communications methods with the Main Process (500), which can include such communications methods as fiber optic communications, Ethernet, TCP/IP, and other methods suitable for significant distance separation between the DS Process (503) and the Main Process (500), and can include local bus interfacing. The DS Communications Process—USB (703) monitors the state of the DS USB signals to the USB hub or device (573) and advises the DS Control Process (701) when a device is attached and the speed, low or full, of the attached peripheral. If the attached peripheral is low speed, Timing Generation Process (705) starts generating low speed EOP's every millisecond. If the attached peripheral is full speed, Timing Generation Process (705) initiates a dialog with the peripheral to determine if the peripheral is high speed. The dialog is defined in the USB Specification paragraphs 7.1.5 and 7.1.7. If this dialog indicates that a high speed peripheral is present, Timing Generation Process (705) starts generating high speed SOF's every 125 microseconds. If the dialog indicates that a high speed peripheral is not present, Timing Generation Process (705) starts generating full speed SOF's every millisecond. When speed has been determined, DS Communications Process—USB (703) informs DS Control Process (701) that a peripheral has been attached and the speed. DS Control Process (701) in turn informs the Main Process (500) that a device has been attached and reports its speed. Main Process (500) assigns an address to the peripheral and commands the DS Process (503) to obtain additional information about the peripheral. DS Control Process (701) sends commands via DS Communications Process—USB (703) to obtain information about the device. If the attached peripheral is a hub, Main Process (500) commands Hub Management Process (706) to start periodic status inquiries to check if attachments are made to any hub port. If attachment is detected, the Main Process (500) and DS Control Process (701) cooperate to determine speed and type of the attached peripheral. Main Process (500) assigns an address to each newly attached peripheral until the number of hubs in series exceeds the limit in the USB specification or the number of devices reaches the number allowed for this DS Process (503) as specified in the data structures of the Main Process (500). Similarly, when a peripheral, device or hub, is detached, the event is detected by DS Communications Process—USB (703) or by Hub Management Process (706) if the detach event occurs at a hub port. The event is reported by DS Control Process (701) to the Main Process (500). Main Process (500) then commands the appropriate US Process (501) to issue state SE0, signaling detach, to USB host (571). If an USB host (571) issues a command enabling the Remote Wakeup Feature, it is noted by the Main Process (500). When subsequently US Process (501) reports Loss Of Activity, the Main Process (500) commands the DS Process (503) to stop generation of the frame timing signals to the USB hub or device (573). The DS Control Process (701) commands Timing Generation Process (705) to stop generation of the frame timing signals to the USB hub or device (573). The DS Communications Process—USB (703) monitors the state of the signals to the USB hub or device (573) and advises the DS Control Process (701) when resume signaling is detected. DS Control Process (701) passes this information to the Main Process (500) via DS Communications Process—MP (702). Main Process (500) then commands the appropriate US Process (501) to issue resume signaling to USB host (571). The DS Control Process (701) in each DS Process (503) autonomously coordinates actions of the processes comprising each DS Process (503), using information received from the Main Process (500) as needed, thereby providing timing independence from other DS Processes (503) and from US Processes (501), and allowing the enhancements to USB applications practiced by the present invention.

Figure 12:
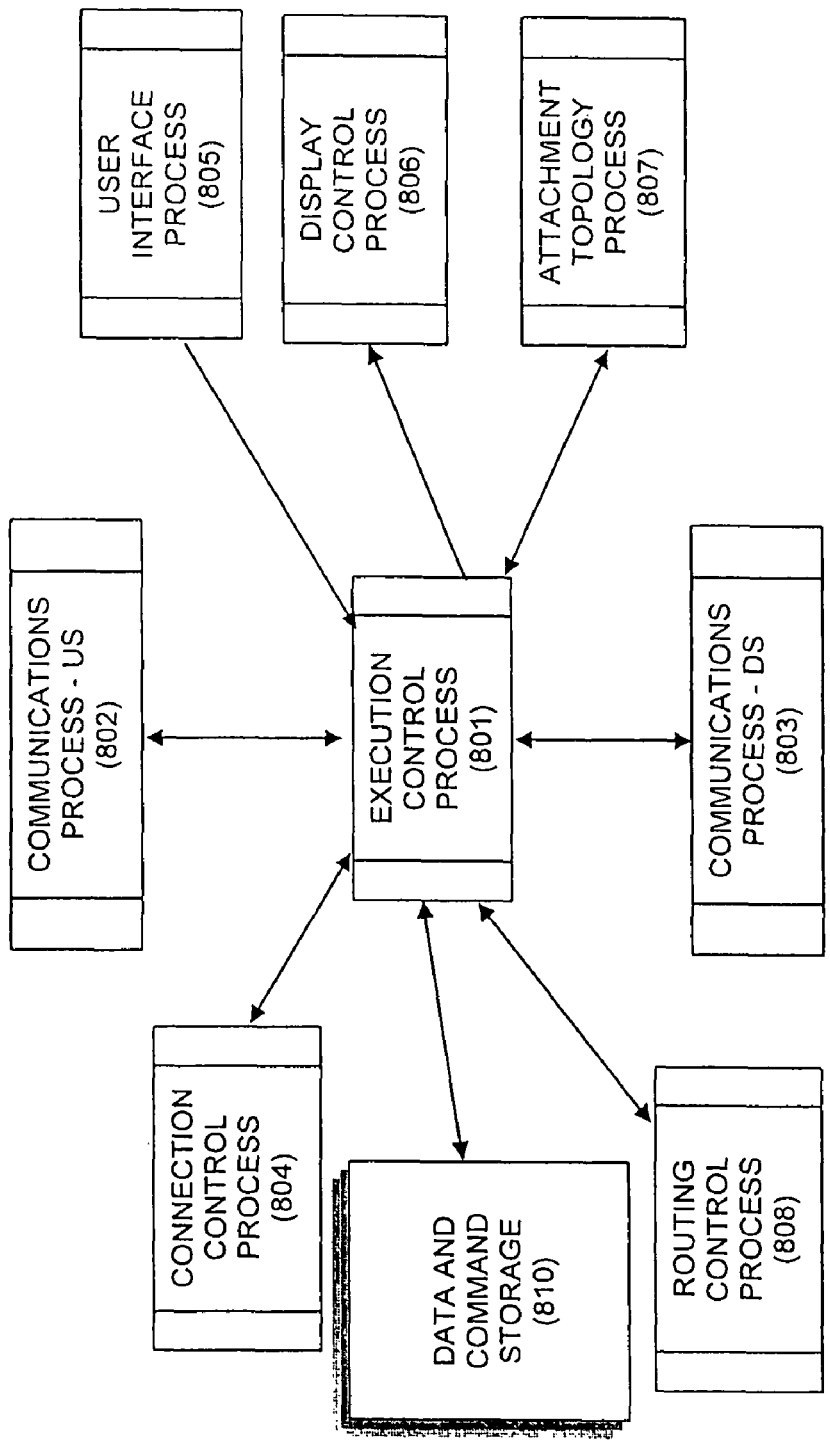
FIG. 12 is a diagram of the processes of the Main Process in accordance with an embodiment of the present invention.

FIG. 12 shows the structure of the software of the Main Process (500) in accordance with an embodiment of the present invention. Main Process (500) coordinates US Processes (501) and DS Processes (503), all operating independently, routes information bidirectionally among DS Processes (503) and US Processes (501), maintains information about the attachment topology of hubs and devices attached to the DS Processes, and provides facilities for user control and indications. Execution Control Process (ECP) (801) controls and coordinates the functional components of the Main Process (500). Display Control Process (806) provides system state indications from information existing within the Main Process (500), such as in the Connection Control Process (804). Among the functions available via the User Interface Process (805) is switching of devices to hosts by providing information to the Connection Control Process (804). Routing Control Process (808) provides physical addressing information and directs information flow from/to US Processes (501) and DS Processes (503). In addition to using information from the Connection Control Process (804), Routing Control Process (808) uses information in messages stored in the Data and Command Storage (DCS) (810) to determine the destination. Routing Control Process (808) also remaps device addresses assigned by an USB host (571), as reported by an US Process (501), to device addresses assigned to a device by Attachment Topology Process (807).

Communications Process—US (802) manages communications with US Processes (501). Communications Process—DS (803) manages communications with DS Processes (503). A practitioner of ordinary skill in the art will understand that the communications method with the US Processes (501) and the communications method with the DS Processes (503) may be different from each other in nature, or that they may be of the same nature. The communications method can be the most suitable for the intended application, and can include fiber optic communications, Ethernet, TCP/IP, and other methods suitable for significant distance separation between the US Processes (501), the Main Process (500), and can include local bus interfacing. Attachment Topology Process (ATP) (807) receives and processes reports of peripheral attachment and detachment reported by the DS Processes (503). The current downstream attachment topology and address assignment are held in data structures unique for each DS Process (503) and in global data structures. The ATP (807) data structures are illustrated in FIG. 7. FIG. 7(a) and (b) show global data structures Group Definition (301) and Group List (304), respectively. Group Definition (301) specifies the number of DS Processes (503) in a group in group _size (302) and the number of groups in no_groups (303). The Group List (304) specifies which DS Processes (503) are part of one group, and contains a number of lists equal to the number of groups, specified in no_groups (303). FIG. 7(c) shows the Device Control (305) data structure, which contains an element, devices_left_j (317), for each group. Device Control (305) controls the number of devices that can be attached to DS Processes (503) in one group. Each element, devices_left_j (317), is dynamically controlled as devices are attached and detached. FIG. 7(d) shows the data structure next_address (306) and Peripheral_Definition_List (PDL) (307), which exists for each DS Process (503). The PDL (307) entries p_address (310), p_class (311), p_speed (312), higher_hub_address (313), port_no (314), and no_of_ports (315) form one element, of the PDL (307). The number of elements dynamically increases and decreases during operation as devices and hubs are attached and detached.

The methods and systems described above overcome the limitations of the USB specification given above and of the prior art and permit enhancements in connection separation length between USB-compliant devices and USB hosts, in switching one or more USB-compliant devices among many USB hosts and in connecting many USB-compliant devices to the same USB host with control over their communications such that they do not interfere with one another. No changes or modifications are needed to USB hosts, hubs or USB-compliant devices; standard hosts, hubs and devices can be used with the current invention. It will be understood that alternatives, modifications and variations thereof may be suggested to those skilled in the art.

What is claimed:

1. A system for enhancing universal serial bus (USB) applications, comprising:
    an upstream processor for accepting standard USB signals from a USB host and independently providing responses required by USB specification within the time required by said USB specification using a time base of said USB host to manage upstream communications;
    a downstream processor connectable to USB-compliant devices for accepting said standard USB signals from said USB-compliant devices and providing responses required by said USB specification within the time required by said USB specification using an independent time base to manage downstream communications; and
    a main controller for interconnecting said upstream processor and said downstream processor and providing time decoupling between said upstream communications and said downstream communications.

2. The system of claim 1, further comprising a plurality of upstream processors and a plurality of downstream processors.

3. The system of claim 1, wherein said downstream processor comprises module for independently generating downstream frame timing signals to a USB-compliant device in accordance with said USB Specification.

4. The system of claim 1, wherein said main controller comprises a module for managing a downstream USB-compliant device connection topology which accounts for hubs.

5. The system of claim 2, wherein said main controller comprises a module for routing information between a specific upstream processor and a specific Downstream processor.

6. The system of claim 5, wherein said module for routing is operable to route information to more than one upstream processor from more than one downstream processor.

7. The system of claim 5, wherein said module for routing is operable to define and change routing information.

8. The system of claim 5, wherein said module for routing is operable to dynamically inhibit information flow from a USB-compliant device.

9. The system of claim 1, further comprising a means to provide separation between upstream and downstream processing beyond limits of USB specification.

10. A method of enhancing universal serial bus (USB) applications, comprising the steps of:
accepting standard USB signals from a USB host by an upstream processor and independently providing responses required by USB specification within the time required by said USB specification using a time base of said USB host to manage upstream communications;
accepting said standard USB signals from USB-compliant devices by a downstream processor and providing responses required by said USB specification within the time required by said USB specification using an independent time base to manage downstream communications; and
interconnecting said upstream processor and said downstream processor and providing time decoupling between upstream and downstream communications by a main controller.

11. The method of claim 10, further comprising the step of independently generating downstream frame timing signals to a USB-compliant device in accordance with said USB Specification.

12. The method of claim 10, further comprising the step of managing a downstream USB-compliant device connection topology which accounts for hubs.

13. The method of claim 10, further comprising the step of routing information between a specific upstream processor and a specific Downstream processor.

14. A computer readable storage medium comprising code for enhancing universal serial bus (USB) applications, said code comprising the instructions for:
accepting standard USB signals from a USB host by an upstream processor and independently providing responses required by USB specification within the time required by said USB specification using a time base of said USB host to manage upstream communications;
accepting said standard USB signals from USB-compliant devices by a downstream processor and providing responses required by said USB specification within the time required by said USB specification using an independent time base to manage downstream communications; and
interconnecting said upstream processor and said downstream processor and providing time decoupling between upstream and downstream communications by a main controller.

15. The computer storage readable medium of claim 14, further comprising the instruction for independently generating downstream frame timing signals to a USB-compliant device in accordance with said USB Specification.

16. The computer readable storage medium of claim 14, further comprising the instruction for managing a downstream USB-compliant device connection topology which accounts for hubs.

17. The computer readable storage medium of claim 14, further comprising the instruction for routing information between a specific upstream processor and a specific Downstream processor.

18. The system of claim 1, wherein said upstream processor comprises an intelligent host request handler which bases its behavior on a type of a host request and system condition information received from said main controller; and wherein said downstream processor comprises an intelligent connection and device manager for managing address mapping, providing information about said USB-compliant devices to said main controller, and forwarding commands from said main controller to said USB-compliant devices.

19. The method of claim 10, further comprising the steps of basing the behavior of said upstream processor on a type of a host request and system condition information received from said main controller; and managing address mapping, providing information about said USB-compliant devices to said main controller, and forwarding commands from said main controller to said USB-compliant devices by said downstream processor.

20. The computer readable storage medium of claim 14, further comprising the instructions for basing the behavior of said upstream processor on a type of a host request and system condition information received from said main controller; and managing address mapping, providing information about said USB-compliant devices to said main controller, and forwarding commands from said main controller to said USB-compliant devices by said downstream processor.

* * * * *